(12) United States Patent
Ferris et al.

(10) Patent No.: US 9,574,666 B2
(45) Date of Patent: Feb. 21, 2017

(54) MECHANICAL FACE SEAL WITH A REVERSE TRAPEZOIDAL FACE PATTERN

(71) Applicants: Jason Ferris, Plainwell, MI (US); Larry Jacobs, Kalamazoo, MI (US); Christopher Gray, Westminster, CO (US)

(72) Inventors: Jason Ferris, Plainwell, MI (US); Larry Jacobs, Kalamazoo, MI (US); Christopher Gray, Westminster, CO (US)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 14/162,061

(22) Filed: Jan. 23, 2014

(65) Prior Publication Data

US 2014/0203517 A1    Jul. 24, 2014

Related U.S. Application Data

(60) Provisional application No. 61/755,644, filed on Jan. 23, 2013.

(51) Int. Cl.
*F16J 15/34* (2006.01)

(52) U.S. Cl.
CPC ......... *F16J 15/3428* (2013.01); *F16J 15/3412* (2013.01)

(58) Field of Classification Search
USPC ........ 277/399–401, 367, 408, 403, 409, 369
See application file for complete search history.

(56) References Cited

U.S. PATENT DOCUMENTS 3,695,789 A * 10/1972 Jansson ........................... 418/75
3,744,805 A * 7/1973 Heinrich ....................... 277/400
(Continued)

FOREIGN PATENT DOCUMENTS

| DE | 3734704 | 5/1988 |
| EP | 499370 | 8/1992 |
| EP | 632219 | 1/1995 |

OTHER PUBLICATIONS

The International Search Report and Written Opinion of the International Searching Authority for PCT/US2014/12699, date completed Apr. 24, 2014, date mailed May 8, 2014.

*Primary Examiner* — Kristina Fulton
*Assistant Examiner* — Eugene G Byrd
(74) *Attorney, Agent, or Firm* — Miller Canfield Paddock and Stone; Mark L Maki

(57) ABSTRACT

An improved mechanical face seal is provided which includes a pair of relatively rotatable seal rings having opposing seal faces. At least one of the seal faces includes a reverse trapezoidal face pattern having a sine wave depth profile wherein individual face features are circumferentially spaced over the seal face. The reverse trapezoidal face pattern serves to generate a hydrodynamic lift which provides a stable separation of the seal faces that permits formation of a fluid film between the seal faces. The individual trapezoidal grooves have a sinusoidal or similarly shaped depth profile wherein the trapezoid shape is arranged with the narrower edge communicating with the high pressure side of the seal, and the wider edge forms a circumferential dam region towards the low pressure side of the seal. Alternatively, the reverse trapezoidal face pattern may also be provided as a primary face pattern on a dry gas seal in combination with a secondary face pattern wherein the faces operate with a controlled gap under normal pressure (Continued)

conditions as well as when the pressure direction across the seal face is reversed.

33 Claims, 13 Drawing Sheets

(56) References Cited

U.S. PATENT DOCUMENTS

| | | | |
|---|---|---|---|
| 3,782,737 A * | 1/1974 | Ludwig et al. | 277/400 |
| 3,804,424 A * | 4/1974 | Gardner | 277/360 |
| 4,836,561 A * | 6/1989 | Lebeck et al. | 277/400 |
| 4,969,810 A * | 11/1990 | Stolle et al. | 418/55.4 |
| 5,092,612 A * | 3/1992 | Victor et al. | 277/400 |
| 5,174,584 A * | 12/1992 | Lahrman | 277/400 |
| 5,180,173 A * | 1/1993 | Kimura et al. | 277/400 |
| 5,222,743 A * | 6/1993 | Goldswain et al. | 277/400 |
| 5,224,714 A * | 7/1993 | Kimura et al. | 277/400 |
| 5,375,855 A | 12/1994 | Goldswain et al. | |
| 5,398,943 A * | 3/1995 | Shimizu et al. | 277/400 |
| 5,435,574 A | 7/1995 | Victor et al. | |
| 5,496,047 A * | 3/1996 | Goldswain et al. | 277/400 |
| 5,529,318 A * | 6/1996 | Fuse et al. | 277/400 |
| 5,605,339 A * | 2/1997 | Pecht et al. | 277/400 |
| 5,664,787 A * | 9/1997 | Fuse et al. | 277/400 |
| 5,702,110 A * | 12/1997 | Sedy | 277/400 |
| 5,722,665 A * | 3/1998 | Sedy et al. | 277/400 |
| 6,142,478 A * | 11/2000 | Pecht et al. | 277/400 |
| 6,152,452 A | 11/2000 | Wang | |
| 6,189,896 B1 * | 2/2001 | Dickey et al. | 277/608 |
| 6,257,589 B1 * | 7/2001 | Flaherty et al. | 277/400 |
| 6,446,976 B1 * | 9/2002 | Key et al. | 277/367 |
| 6,575,470 B1 | 6/2003 | Gacek et al. | |
| 6,655,694 B1 | 12/2003 | Nakano | |
| 6,726,213 B2 | 4/2004 | Wang | |
| 7,194,803 B2 * | 3/2007 | Young et al. | 29/888.3 |
| 7,377,518 B2 * | 5/2008 | Lai | 277/400 |
| 7,770,898 B2 * | 8/2010 | Dietle et al. | 277/559 |
| 8,074,995 B2 * | 12/2011 | Vasagar et al. | 277/301 |
| 8,162,322 B2 * | 4/2012 | Flaherty | 277/400 |
| 8,757,632 B2 * | 6/2014 | Dobosz et al. | 277/399 |
| 2009/0279817 A1 * | 11/2009 | Shimizu et al. | 384/107 |

* cited by examiner

MECHANICAL FACE SEAL WITH A REVERSE TRAPEZOIDAL FACE PATTERN

CROSS REFERENCE TO RELATED APPLICATIONS

This application asserts priority from provisional application 61/755,644, filed on Jan. 23, 2013, which is incorporated herein by reference.

FIELD OF THE INVENTION

The invention relates to a mechanical seal arrangement, which includes a hydrodynamic face pattern, and more particularly relates to a seal face having a reverse trapezoidal face pattern providing improved hydrodynamic film stiffness in a bidirectional pattern.

BACKGROUND OF THE INVENTION

Mechanical face seals are used on various types of machines and equipment, such as pumps, compressors and gear boxes, which have rotating shafts and a sealing chamber adjacent the shaft wherein a fluid in the sealing chamber is prevented from leaking along the shaft. Such mechanical seals include a pair of adjacent seal rings having opposing seal faces which define a sealing region therebetween. One of these seal rings typically is mounted on the shaft so as to rotate therewith while the other seal ring is non-rotatably mounted on a seal housing. The fluid being sealed is disposed on one edge of the sealing region, wherein the opposing seal faces at least reduce leakage of the sealed fluid across the sealing region.

Most liquid seals operate with the seal faces rotating in contact. However, due to asperities in the seal faces, some leakage may occur. In gas seals, the seal faces often are provided with grooves or recesses to generate hydrodynamic lifting forces. In this regard, the seal faces typically separate a small distance wherein a thin film of fluid forms between the seal faces to lubricate the seal faces and reduce wear therebetween. Additionally, the grooves or recesses may pump the fluid film toward the fluid being sealed to reduce leakage of the sealed fluid.

With respect to the specific constructions of mechanical seals, one representative mechanical seal is disclosed in U.S. Pat. No. 6,446,976 (Key et al), the disclosure of which is incorporated herein in its entirety by reference. In this mechanical seal, one of the seal faces includes a plurality of concentric shallow annular grooves which preferably are disposed near the seal ring diameter that is farthest away from the fluid being sealed. In general, the basic construction of mechanical seals and the use of relatively rotatable seal rings are well known, and a detailed discussion of such mechanical seals is not required herein.

More particularly, dry running lift-off face seals, also called fluid film, gap, or non-contacting face seals, have found application in both gas and liquid sealing applications in compressors and pumps. The fluid film between the seal faces allows the seal to operate with minimum heat generation and no wear.

Dry running lift-off face seals utilize a variety of shapes of shallow grooves to create lift between the seal faces, allowing the faces to run without contact. Existing examples include spiral grooves, radially tapered waves, and T-grooves. These various grooves are designed to provide a varying combination of hydrostatic and hydrodynamic load support to achieve separation of the seal faces by a small gap. Hydrostatic load support is created through the manipulation of the fluid pressures acting between the seal faces, and is not dependant on motion between the seal faces to create lift. Hydrodynamic load support is created through the active compression of the fluid between the seal faces due to movement of the fluid from a wide gap to a narrower gap, and requires relative motion between the seal faces to create lift. This relative motion typically occurs during shaft rotation.

The geometry of the shallow grooves determines the amount of hydrostatic and hydrodynamic load support created at a given set of operating parameters. The total load support provided must be in equilibrium with the pressure and mechanical forces that act to close the seal faces at a specified operating gap.

Also important to the design of lift-off face seals is the resistance of the fluid film to a changing gap, commonly referred to as film stiffness. This effect acts similar to a spring between the seal faces, increasing the forces for load support as the gap is narrowed, and decreasing the forces as the gap is made larger. This stiffness varies in a generally cubic relationship to the gap, and as a result encourages the seal faces to maintain equilibrium at a consistent gap. Changes to the geometry of the shallow grooves can have an effect on the stiffness value at a given gap, which then determines the stability of the seal at that gap. This is especially important during vibration or other off-design operation of the sealed equipment to maintain a consistent sealing gap and prevent damage to the seal faces from contact.

Lift-off shallow groove patterns for seal faces are typically designed to be either uni-directional or bidirectional depending on manufacturer's preference and application requirements. Uni-directional patterns such as spiral grooves generally produce higher film stiffness values than bidirectional patterns like waves or T-slots due to a stronger pumping effect. However, uni-directional patterns are only effective when the shaft rotates in one direction, but no longer operate during shaft rotation in the opposite direction. The disadvantage of uni-directional patterns is that they run with hard contact between the seal faces in events of reverse rotation, which often occurs in installations due to reversed flow of liquid through the pump. Bi-directional face patterns are effective in both directions of shaft rotation.

The objective of this invention is to provide an improved shallow groove pattern for bidirectional operation with a geometry that provides more efficient pumping and compression of the film gas, resulting in film stiffness values more closely resembling those of uni-directional patterns. This pattern also allows for the variation of hydrostatic and hydrodynamic effects based on the groove depths and pattern angles.

The invention relates to a reverse trapezoidal face pattern for mechanical face seals, as well as a mechanical seal or seal ring incorporating such feature. At least one of the seal faces includes a plurality of reverse trapezoidal features which are distributed in circumferentially spaced relation over the seal face. The term reverse trapezoidal feature or groove refers to a hydrodynamic face feature which has a generally trapezoidal shape defined by a short circumferential edge, a longer circumferential edge and side edges which extend radially between the circumferential edges. The reverse trapezoidal feature has the short circumferential edge located along a seal ring diameter so as to define an open edge which receives fluid into the reverse trapezoidal groove. This differs from a known trapezoidal face pattern which has the long circumferential edge located at the seal ring diameter which edge also receives fluid into the groove. The known trapezoidal face pattern creates significant differences in lift and fluid flow in comparison to the reverse trapezoidal face pattern of the invention. More particularly, the reverse trapezoidal face pattern serves to generate a hydrodynamic lift in either rotation direction which provides a stable separation of the seal faces that permits formation of a fluid film between the seal faces. Rather than the fluid film being generated solely by the static pressure of the fluid being sealed, the hydrodynamic lift features generate lift dynamically during shaft rotation to provide a lift load which is stable.

In the improved seal arrangement of the present invention, the groove pattern consists of a trapezoidal boundary defining the outer side edges and circumferential edges of each groove, and a sinusoidal or similarly shaped depth profile extending in the circumferential direction between the side edge boundaries. The trapezoidal boundary is not a true trapezoidal shape in appearance due to the circumferential stretching of the boundary along the annular seal face. The trapezoid shape is arranged with the narrower edge communicating with the high pressure side of the seal, and the wider edge forming a circumferential dam region towards the low pressure side of the seal.

The high pressure side of the seal can be either at the outside diameter or inside diameter of the seal face depending on the seal arrangement. The sinusoidal depth profile of the groove varies in depth amplitude radially, with the maximum depth amplitude occurring at the narrow edge of the trapezoid and the minimum depth amplitude occurring at the wider edge of the groove. The number of grooves and the circumferential width of the grooves can be varied to adjust the bias between hydrostatic and hydrodynamic lift.

The reverse trapezoidal shape of the groove pattern causes incoming gas from the high pressure side of the seal face to be drawn in and preferentially directed into the angled portion of the groove along the side edges, creating a pumping action. Since the wider circumferential edge is spaced radially from the short circumferential edge, the side edges angle away from the short circumferential edge and create a corner like area to which the incoming gas flows and then exits to the seal face. Due to the angle of the side edges, the reverse trapezoidal shape impedes recirculation of the fluid back to the high pressure side, which recirculation normally occurs in a conventional trapezoidal face pattern. By reducing radial recirculation back to the high pressure side, the reverse trapezoidal face pattern generates improved lift and film stiffness while reducing fluid recirculation.

The sinusoidal shape is provided with a radially varying depth amplitude and acts to increase compression of the gas as it travels in the groove, while also allowing some recirculation effect at the high pressure boundary that helps to discourage possibly damaging debris and contamination from getting between the seal faces. The combined effect of the reverse trapezoid shape and sinusoidal profile is to increase the incoming flow of gas into the grooves and increase the compression on that gas, resulting in increased hydrodynamic lift and film stiffness. Modeling of the fluid dynamics in this pattern design has shown a significant increase in film stiffness at equivalent gap values with the reverse trapezoidal shaped pattern versus other bidirectional patterns such as a conventional trapezoid face pattern, spiral pattern, and a sinusoidal wave pattern.

In another aspect of the invention, the reverse trapezoidal face pattern may also be provided as the primary face pattern on a dry gas seal in combination with a secondary face pattern which results in an improved ability of the faces to operate with a controlled gap under normal pressure conditions as well as when the pressure direction across the seal face is reversed. This combined pattern employs the following features:

1) A primary shallow groove pattern along the periphery of the seal face towards the normal high pressure side of the seal face. This primary pattern is intended to create lift under normal operating conditions. This primary shallow groove pattern preferably comprises any of the sinusoidal or sine wave reverse trapezoidal face patterns of the present invention which define a dam region located radially between the outer the primary face pattern and a ring diameter spaced therefrom. Alternatively, the primary face pattern waves may be spiral grooves with a concentric dam, or even sinusoidal waves.

2) A secondary shallow groove pattern along the opposite diameter or periphery of the seal face towards the normal low pressure side of the seal face. This pattern is intended to create lift under reversed pressure conditions where the normal low pressure side reaches a higher pressure than the pressure defined on the opposite ring diameter. This secondary shallow groove pattern is preferably made up of sinusoidal waves.

With respect to the advantages of this alternate embodiment, one of the primary upset conditions that causes failure of lift-off face seals is a reversal of the pressure direction across the seal face. This upset can be caused either by a loss of the supply of barrier fluid pressure to the seal's barrier cavity, or by an increase in the pressure of the pumped fluid. When this occurs, the pumped fluid is forced between the seal faces. The shallow groove features of typical lift-off face seals do not properly create lift with a pressure reversal condition, resulting in face contact. Due to the relatively wide radial width of lift-off seal faces, significant heat generation results. This can lead to wear and damage of the seal faces, which will then prevent the seal from returning to normal operation as a lift-off seal due to damage to the shallow grooves.

The objective of this aspect of the invention is to provide an improved shallow groove pattern for bidirectional operation having an improved face pattern geometry that permits the seal to maintain lift both in the normal and reversed pressure directions for the seal. This allows the seal to always have a controlled lift between the seal faces regardless of pressure direction, and prevents damage from contact. This feature enables the seal to contain and survive pressure reversal conditions with a return to operation as a lift off gas seal after such an event.

Other objects and purposes of the invention, and variations thereof, will be apparent upon reading the following specification and inspecting the accompanying drawings.

Figure 1:
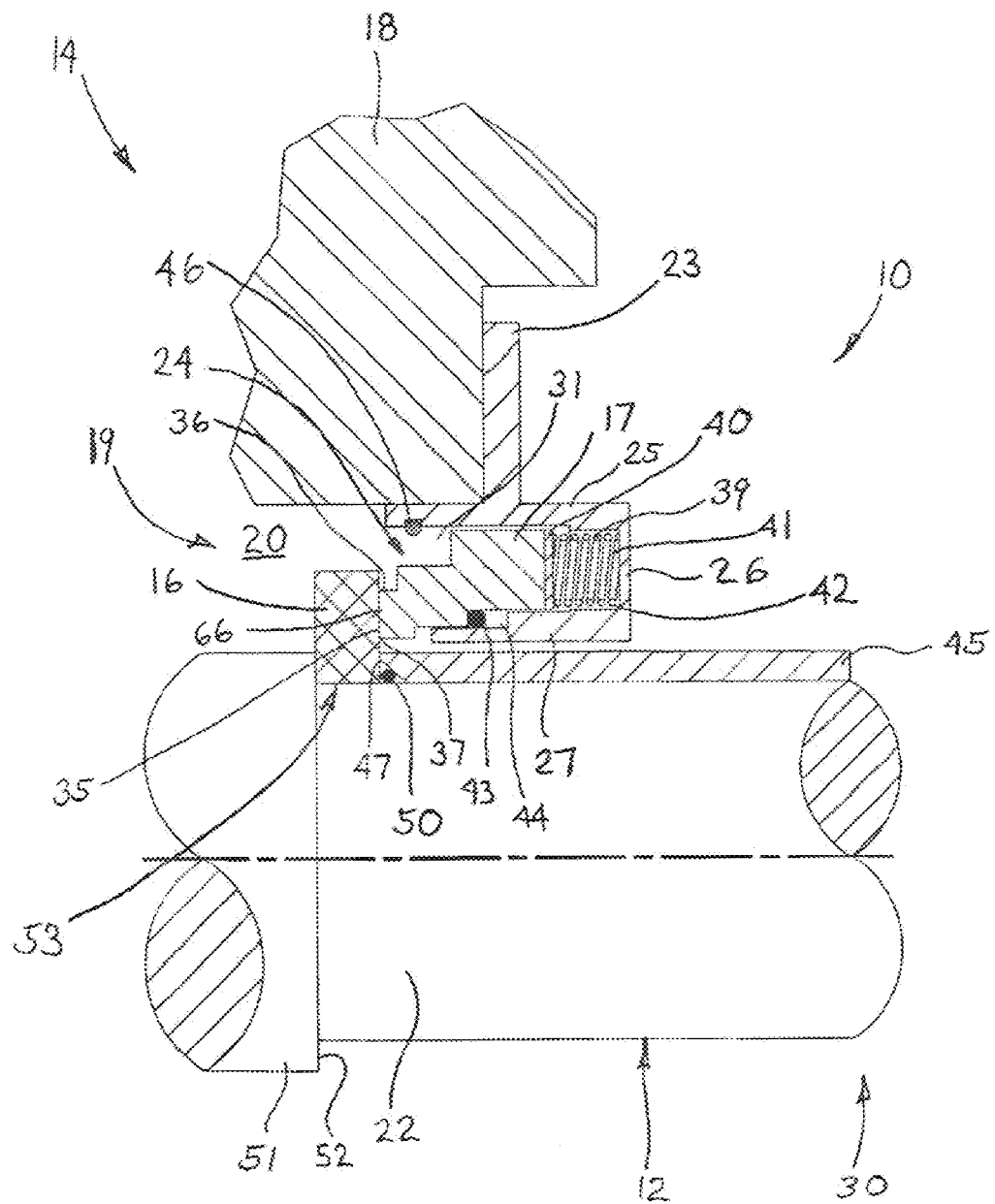
FIG. 1 is a cross-sectional view of a representative mechanical seal assembly.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to FIG. 1, a mechanical face seal 10 is illustrated mounted on the rotatable shaft 12 of a machine 14. The exemplary mechanical seal 10 includes a pair of concentric seal rings 16 and 17 which respectively operate as a rotor and a stator and effectively prevent fluid leakage along the shaft 12. Either of the seal rings 16 and 17 and most preferably, the seal ring, such as a silicon carbide ring, mating with a carbon ring is provided with a reverse trapezoidal face pattern to provide improved performance. As will be described in greater detail hereinafter, the reverse trapezoidal face pattern incorporates a sinusoidal or similarly shaped depth profile wherein the trapezoid shape is arranged with the narrower edge located on one of the ring diameters so as to communicate with the high pressure side of the seal 10, and the wider edge of the face pattern forms a circumferential dam region towards the low pressure side of the seal 10.

It should be understood that FIG. 1 is a representative view of only one possible configuration for a mechanical face seal 10. The skilled artisan will appreciate that the reverse trapezoidal face pattern of the invention is not limited to the illustrated seal 10 and can be used in other types of machines 14 or mechanical seals 10 as needs require.

The machine 14 as illustrated in FIG. 1 includes a housing 18 which defines a seal chamber 19 therein wherein the seal chamber 19 contains a sealed fluid 20 such as a process fluid. The machine 14 further includes a rotating shaft 12 to which the mechanical seal 10 is mounted. The shaft 12 drives components such as gears in a gearbox, a pump or a compressor impeller. The shaft 12 has a conventional circular cross section defined by an outer circumferential shaft surface 22. To prevent leakage of the sealed fluid 20 from the seal chamber 19 along the shaft surface 22, the mechanical face seal 10 is mounted between the machine housing 18 and the shaft 12 and defines a seal radially therebetween to contain the fluid 20.

The mechanical seal 10 includes an annular seal housing or cartridge 23 which mounts to the exterior face of the machine 18 and has an interior cavity 24 which opens axially through the center area of the seal housing 23. The interior seal cavity 24 opens sidewardly to the left in FIG. 1 so as to be in fluid communication with the seal chamber 19 and thereby define an axial extension of the seal chamber 19. The seal cavity or chamber 24 also opens sidewardly to the right so as to be exposed to a pressurized chamber fluid at a greater pressure than the fluid in the seal chamber 19. Hence, additional components can be provided in this region such as additional seal rings in a double seal configuration or other seal components.

In this exemplary embodiment, the seal housing 23 further includes an outer wall 25, an end wall 26 which extends radially inwardly toward the shaft 12, and an inner wall 27 which is disposed proximate to but spaced radially from the outer shaft surface 22. The shaft 12 extends axially out of the seal chamber 19 and through the interior cavity 24 of the mechanical seal 10 whereby an exposed end section 30 of the shaft 12 projects outwardly past the end wall 26 for connection to a motor or other drive unit of the machine 14.

The outer and inner walls 25 and 27 define an annular seal ring pocket 31 that opens axially toward the seal chamber 19. The seal ring pocket 31 is adapted to slidably receive the seal ring 17 therein, wherein the seal ring 17 is essentially concentric to the shaft 12.

The seal ring 17 serves as a primary ring of the mechanical seal 10, and includes a seal face 35 which extends radially between the outside and inside seal ring diameters 36 and 37. Thus, the outside diameter 36 is exposed to the fluid 20 being sealed within the chamber 24 while the inside diameter 37 is exposed to a chamber fluid.

In one configuration, the chamber fluid in the chamber 24 is pressurized so that the high pressure side is defined on the inner ring diameters and the low pressure side being defined on the outer ring diameters. In this regard, the seal 10 may be provided in a single, double or other configuration wherein the chamber fluid is a pressurized barrier gas which is supplied at a pressure higher than the process fluid 20. However, alternate seal configurations could be provided wherein the high pressure barrier fluid is provided on the OD of the seal rings and a lower pressure process fluid is provided on the ID of the seal rings. It will be understood that the present invention is usable with virtually any seal configuration.

The seal ring 17 is prevented from rotating relative to the seal housing 23 by drive pins which engage the outermost circumferential surface of seal ring 17, and is biased axially toward the other seal ring 16 by a plurality of circumferentially spaced apart springs 39 which project axially from the seal housing end wall 26 into the pocket 31. In particular, the outer end of each spring 39 abuts axially against an annular backing plate 40 on the back face of the seal ring 17 as illustrated in FIG. 1. The opposite inner end 41 of each spring 39 is seated in a corresponding bore 42 formed in the end wall 26. Alternate biasing members may be used besides springs.

To prevent migration of the sealed fluid 20 along the circumferential and back faces of the seal ring 17, an O-ring 43 is provided in an annular groove 44 in the inner wall 27 to define a secondary seal. The O-ring 43 also acts to center the seal ring 17 relative to the shaft 12.

For assembly, a rigid retaining ring 46 is provided on the seal housing 23 to limit forward movement of the seal ring 17. The ring 46 confines the seal ring 17 within the housing 23.

To support the mating seal ring 16 in sealing engagement with the primary seal ring 17, a shaft sleeve 45 is non-rotatably connected to the shaft 12 so as to rotate in unison with the shaft 12. In particular, the shaft sleeve 45 has a generally tubular cross-section and has an annular end face 47 which projects radially outwardly from the shaft surface 22.

During assembly, the sleeve 45 is slidably received on the periphery of the shaft 12 and the sealed fluid 20 is prevented from leaking between the shaft sleeve 45 and the shaft 12 by an O-ring 50 which defines a secondary seal between the inner face of the shaft sleeve 45 and the outer shaft surface 22. When secured in place, the sleeve end face 47 is spaced axially from a circumferential shoulder 51 formed on the shaft 12. The shoulder 51 has a face 52 which faces axially toward the sleeve face 47 in spaced relation to define a seal ring pocket 53 therebetween.

As to the seal ring 16, the seal ring 16 defines a mating ring which sealingly mates with the primary ring 17. During assembly, the seal ring 16 is slid axially onto the shaft 12 and abuts against the shoulder 51. The shaft sleeve 45 is then slid onto the shaft 12 wherein the seal ring 16 is confined between the faces 52 and 47.

The seal ring 16 further includes a seal face 66 which faces axially toward the opposing seal face 35 of the primary ring 17. The seal face 66 extends radially between an outside diameter 67 thereof and an inside diameter 68. As seen in FIG. 1, the seal face 66 abuts against the O-ring 50 near the inside diameter 68 to prevent leakage of the fluid 20 between the seal ring 16 and the shaft 12.

With the above-described arrangement, the seal ring 17 is non-rotatably supported in the seal housing 23 while the opposing seal ring 16 is rotatably supported on the shaft 12 so as to rotate in unison therewith. When the shaft 12 is not rotating, the opposing seal faces 35 and 66 are disposed in contacting relation due to the biasing force of the springs 39 to prevent migration of the liquid being sealed radially inwardly across the sealing region which extends radially across these seal faces 35 and 66. During shaft rotation, the resilient spring loading of the seal ring 17 permits the seal ring 17 to be displaced axially away from the seal face 66 further into the pocket 31. Therefore, during shaft rotation, the seal faces 35 and 66 separate slightly whereby a liquid film is defined therebetween as will be described in further detail hereinafter. Even though seal face separation is permitted, the springs 39 continue to generate an axial closing force on the seal ring 16 which is balanced by the fluid film stiffness.

In order to eliminate leakage of the fluid 20 across the seal faces 35/66 even when the fluid film is generated therebetween, the mechanical seal 10 can be manufactured with a reverse trapezoidal face pattern as illustrated in FIGS. 2-8. While the following discussion references seal rings 16/17 and seal faces 35/66, it will be understood that the present invention may be applied to any suitable seal ring and seal face and the following discussion is not limited to a specific ring structure or the seal configuration shown in FIG. 1. As such, a representative seal ring 71 is shown in FIGS. 2-8 which includes a seal face 72 extending radially between its inner diameter 73 and its outer diameter 74. These reference numerals are used through the remaining drawings to generally identify any suitable seal ring such as either of seal rings 16 or 17.

More particularly, this invention provides an improved shallow groove pattern for bidirectional seal rotation, which possesses a geometry that provides more efficient pumping and compression of the film gas, resulting in film stiffness values more closely resembling those of uni-directional patterns. This inventive face pattern also allows for the variation of hydrostatic and hydrodynamic effects based on the groove depths and pattern angles.

Figure 2:
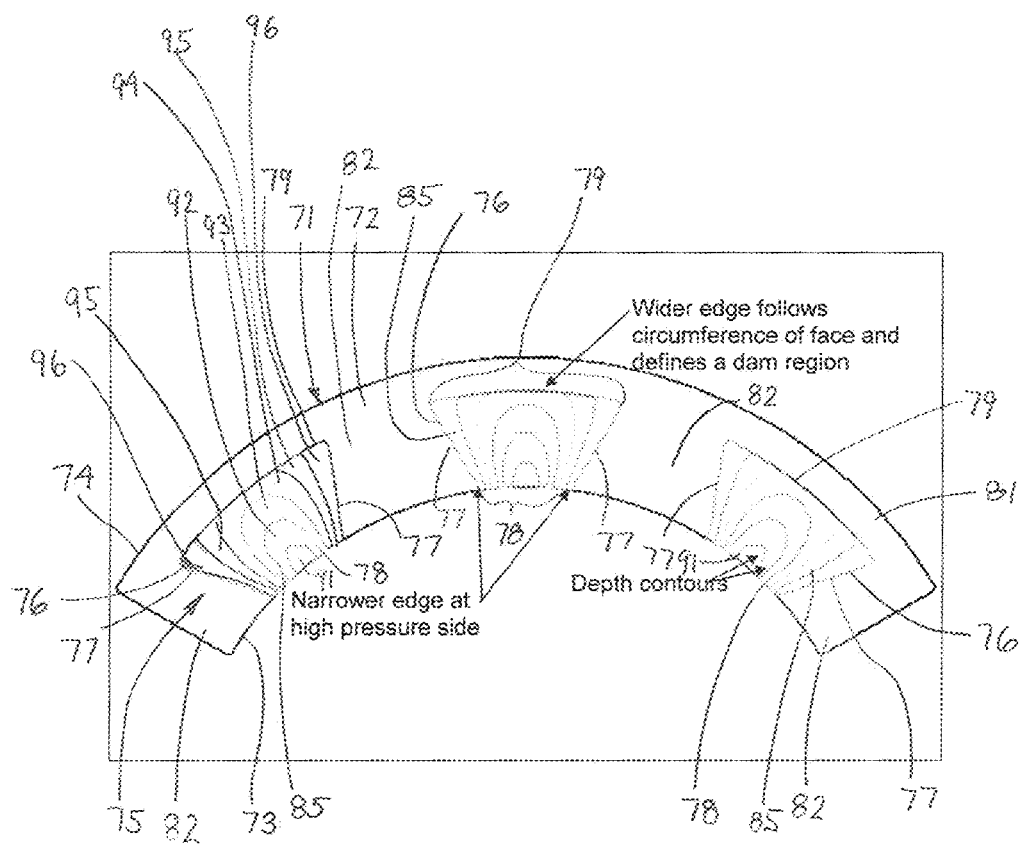
FIG. 2 is a plan view of a reverse trapezoidal face pattern located on an inside diameter of a seal ring.

Referring to FIG. 2, a reverse trapezoidal face or groove pattern 75 is shown on a seal face 72. The face pattern 75 comprises a plurality of reverse trapezoidal features or grooves 76 which are distributed in circumferentially spaced relation over the seal face 72. During shaft rotation, the reverse trapezoidal face pattern 75 serves to generate hydrodynamic lift which provides a stable separation of seal faces that permits formation of a fluid film between the seal face 72 and an opposing seal face. Rather than the fluid film being generated solely by the static pressure of the fluid 20 being sealed, the hydrodynamic face pattern 75 generates lift dynamically during shaft rotation to provide a lift load which is stable.

In the improved seal arrangement shown in FIG. 2, the face pattern 75 consists of a trapezoidal boundary for each feature or groove 76 which is defined by outer side edges 77 and circumferential edges 78 and 79. The trapezoidal pattern or boundary shape is not a true trapezoidal shape in appearance due to the circumferential stretching of the boundary as defined by arcuate edges 78 and 79. The term reverse trapezoidal pattern refer to the narrow circumferential edge 78 being the open, inlet side of the groove 76 which receives fluid, while the other, wider edge 79 is closed.

In the configuration of FIG. 2, the higher pressure side of the seal ring 71 is defined on the inner ring diameter 73, and the lower pressure side of the seal ring 71 is defined on the outer ring diameter 74. The trapezoid shape is arranged with the narrower circumferential edge 78 along the inner ring diameter 73 so as to open radially inwardly and communicate with the high pressure side. The wider circumferential edge 79 is spaced radially inwardly from the outer ring diameter 74 so as to form a circumferential dam region 81 on the seal face 72 which is located towards the low pressure side of the seal 10.

Essentially, the dam region 81 is defined by the annular portion of the seal face 72 which is located radially between the outer ring diameter 74 and the wider groove edge 79. This dam region 81 restricts or impedes fluid flow radially outwardly across the seal face 72 during shaft rotation and seal face liftoff. The individual features or grooves 76 are circumferentially separated from each other by intermediate lands 82. While many of the figures illustrate only a portion of the seal ring 71, it will be understood that the seal ring 71 has an annular shape (see FIG. 6) and that the grooves 76 are spaced about the entire circumference of the seal face 72.

Generally as seen in FIG. 2, the bottom surface 85 of each feature 76 is contoured to define a sinusoidal or similarly shaped depth profile extending in the circumferential direction between the side edges or boundaries 77. Additional disclosures herein relative to this sine wave depth profile also may apply to the embodiments of FIGS. 2-8.

The sinusoidal or sine wave depth profile of each groove 76 varies in its depth amplitude radially and circumferentially. The maximum or deepest depth amplitude is defined in a central contour 91 located centrally in the groove 76 at the narrow edge 78 of the trapezoid. The depth varies across progressively shallower contours 92-95 with the minimum depth amplitude defined by contours 96 at the wider edge 79 and along the side edges 77 of the groove 76.

These contours 91-96 allow high pressure fluid to hydrodynamically flow radially into as well as tangentially or circumferentially through the grooves 76 during shaft rotation which causes one seal face to move relative to the other seal face. In other words, the seal face 72 could be on either the stationary seal ring or the rotating seal ring.

As the high pressure fluid flows into the grooves 76 through the narrower groove edge 78, the fluid flows hydrodynamically across the shallower groove portions 95 and 96 defined along the groove edges 77 and 79 and thereby creates a fluid film between two opposed seal faces, which fluid film generates hydrodynamic lift to separate the seal faces. In this regard, the fluid can flow radially across the dam region 81 and across the lands 82 in flow directions or vectors which extend radially, circumferentially or extend with variable components of radial and tangential flow.

More particularly, the trapezoidal shape of the groove pattern 76 causes incoming gas from the high pressure side of the seal face 72 to be drawn in and directed into the angled portion of the groove 76 defined along the side edge 77, creating a pumping action. The sinusoidal shape as provided with a radially varying depth amplitude acts to increase compression of the gas on the high pressure side as it travels in the groove 76, while also creating a recirculation effect at the high pressure boundary that helps to discourage possibly damaging debris and contamination from getting between the seal faces. In more detail, the wider circumferential edge 79 is spaced radially from the short circumferential edge 78, and the side edges 77 angle away from the short circumferential edge 78 and create a corner like area to which the incoming gas flows and then exits to the seal face 72. Due to the angle of side edges 77, the reverse trapezoidal shape impedes and reduces recirculation of the fluid back to the high pressure side at the diameter 73, which recirculation normally occurs in a conventional trapezoid face pattern. By reducing radial recirculation back to the high pressure side while still permitting some recirculation for debris clearance, the reverse trapezoidal face pattern generates improved lift and film stiffness while reducing fluid recirculation.

The combined effect of the trapezoid shape and sinusoidal profile is to increase the incoming flow of gas into the grooves 76 and increase the compression on that gas, resulting in increased hydrodynamic lift and film stiffness. Modeling of the fluid dynamics in this pattern design has shown a significant increase in film stiffness at equivalent gap values with the trapezoidal shaped pattern versus other bidirectional patterns. It will be understood that the number of grooves 76, the circumferential width of the grooves 76, and the depth profile of the grooves can be varied to adjust the bias between hydrostatic and hydrodynamic lift.

As understood from the above discussion, the high pressure side of the seal 10 can be either at the outer ring diameter 74 or inner diameter 73 of the seal face 72 depending upon the seal arrangement. Referring to FIGS. 3-6, the high pressure side is on the outer diameter 74 and the low pressure is on the inner diameter 73. In this seal configuration, a modified reverse trapezoidal face or groove pattern 100 is shown on seal face 72 which includes a plurality of reverse trapezoidal features or grooves 101.

Like in FIG. 2, the face pattern 100 consists of a trapezoidal boundary for each feature 101 which is defined by outer side edges 102 and narrower and wider circumferential edges 103 and 104. The side edges 102 can be seen to converge symmetrically toward each other toward the narrow circumferential edge 103 to define an inlet angle which is defined relative to the tangent line on the outer ring diameter 74. This inlet angle may vary depending upon the trapezoidal geometry used in this face pattern 100.

In the configuration of FIGS. 3-6, the higher pressure side of the seal ring 71 is defined on the outer ring diameter 74, and the lower pressure side of the seal ring 71 is defined on the inner ring diameter 73. As such, the trapezoid shape is arranged with the narrower circumferential edge 103 along the outer ring diameter 74 so as to open radially outwardly and communicate with the high pressure side, while the wider circumferential edge 104 is spaced radially inwardly from the inner ring diameter 73 so as to form a circumferential dam region 105. The individual features or grooves 101 are circumferentially separated from each other by intermediate lands 106.

Figure 5:
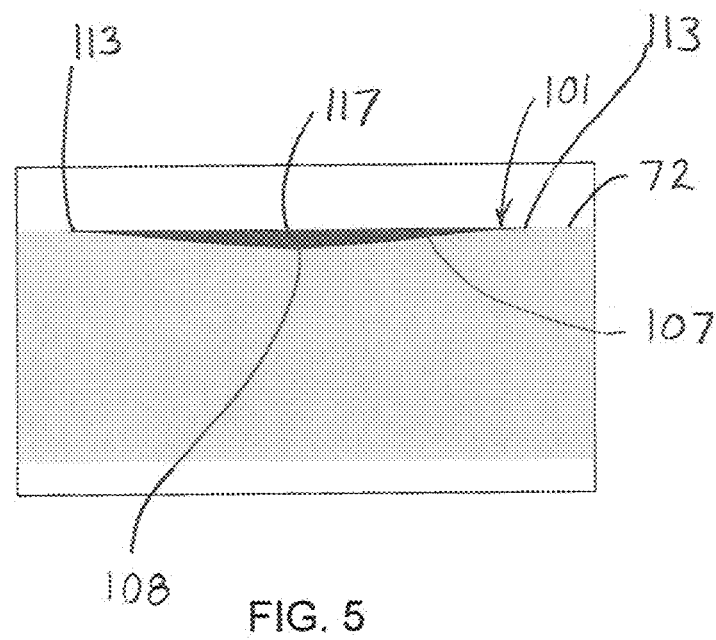
FIG. 5 is a cross-sectional view of the circumferential depth profile as taken circumferentially along line B-B of FIG. 3.
Figure 6:
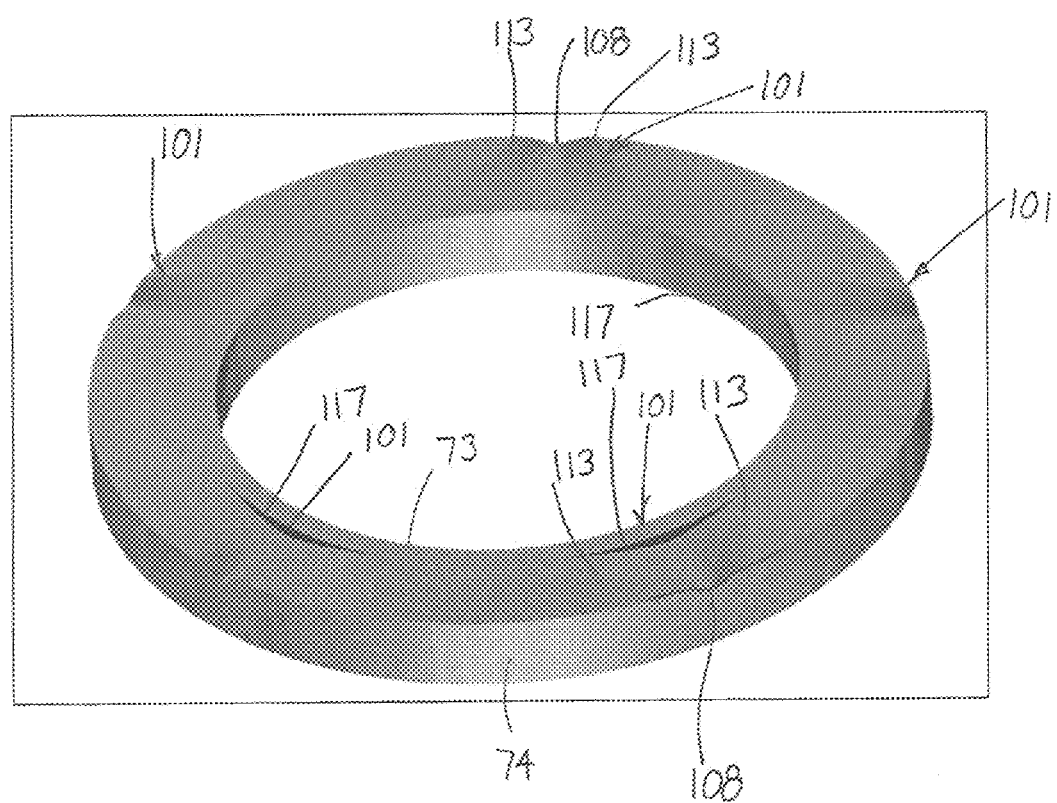
FIG. 6 is a perspective view of the seal ring of FIG. 3.

Generally, the bottom surface 107 of each feature 76 is contoured to define a sinusoidal or similarly shaped depth profile extending in the circumferential direction between the side edges or boundaries 102. Like in FIG. 2, the sinusoidal or sine wave depth profile of each groove 101 varies in its depth amplitude radially and circumferentially. The maximum or deepest depth amplitude is defined in a central contour 108 located centrally in the groove 101 at the narrow edge 103 of the trapezoid. The depth varies through progressively shallower contours 109-113 with the minimum depth amplitude defined by contours 113 at the wider edge 104 and along the side edges 102. These contours 108-113 allow high pressure fluid to hydrodynamically flow radially into as well as tangentially or circumferentially through the grooves 76 during shaft rotation. While FIG. 5 shows that the depth contour may be smoother between contours 108-113, FIG. 6 also shows that the contours 108-113 may define a more pronounced sine wave shape with a concave curvature in the central contour 108 and a more concave curvature in the region of contours 111-113.

Figure 3:
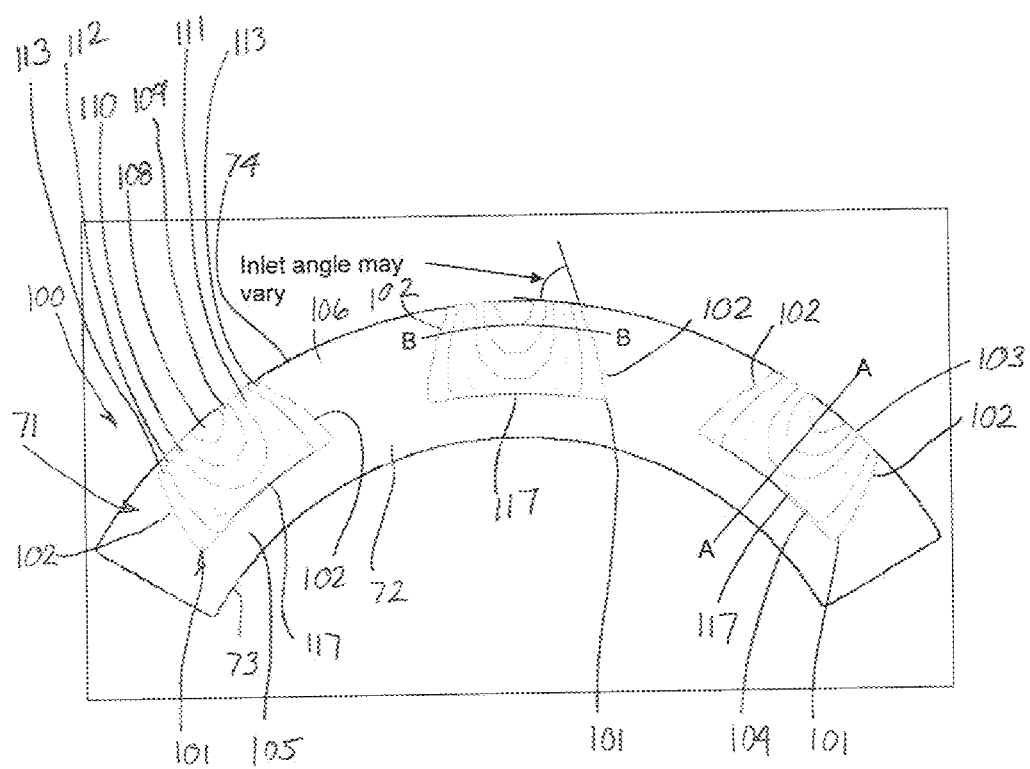
FIG. 3 illustrates the reverse trapezoidal face pattern on an outside diameter of the seal ring.

In the pattern 100 of FIGS. 3-6, the contour 111 may extend in a U-shape and run along a portion of the wide edge 104 as seen in FIG. 3 which circumferentially separates the shallower contours 112 and 113 along one side edge 102 from the similar contours 112 and 113 along the opposite side edge 102. This thereby defines a groove wall 117 along a central portion of the wider edge 104, which is in the form of an abrupt step. Here again, the trapezoidal shape of the groove pattern 101 causes incoming gas from the high pressure side of the seal face 72 to be drawn in and directed circumferentially by the inlet angle of the groove 101 which creates a pumping action and reduces recirculation of the fluid back to the high pressure ring diameter 74.

Figure 7:
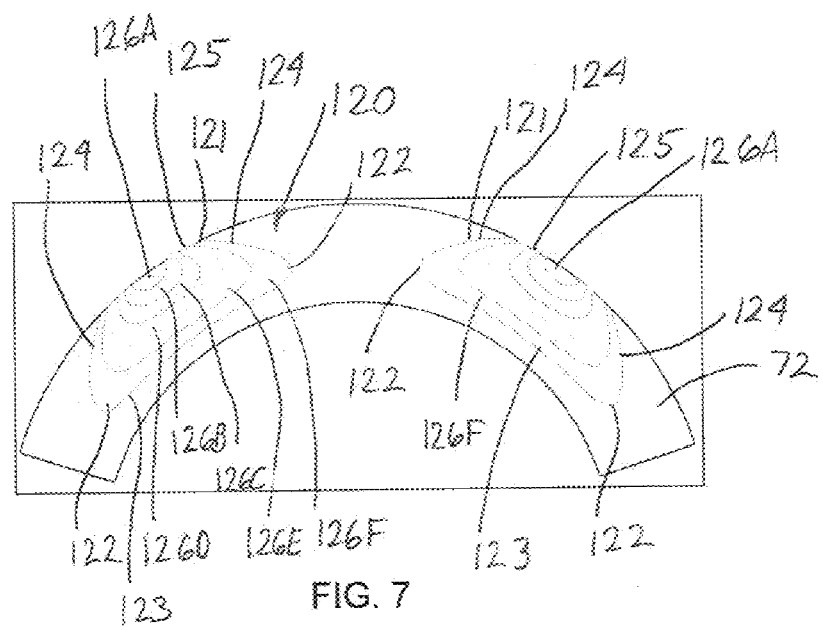
FIG. 7 is a plan view of a second embodiment of a face pattern.

In one alternative embodiment of a reverse trapezoid pattern, FIG. 7 illustrates a face pattern 120 wherein the grooves 121 have corners 122 on the wider circumferential edge 123 provided with a radius wherein the corners 122 are defined at the juncture between the wider circumferential edge 123 and each of the side edges 124. The narrower circumferential edge 125 opens to the high pressure side. The grooves 121 are provided with the sinusoidal depth profile wherein the maximum or deepest depth amplitude is defined in a central contour 126 located centrally at the narrow edge 125. The depth varies through progressively shallower contours 126A-126F with the minimum depth amplitude defined by U-shaped contours 126F. The shallowest contour 126F extends along the length of the wider edge 123 and along the side edges 122. Since the U-shaped contour 126F is continuous, starting at the narrow edge 125 and returning to the narrow edge 125, this allows the elimination of the groove wall 117 since there is zero depth along the circumferential edge 123 and side edges 124. In other words, the circumferential edge 123 and side edges 124 lie in the plane of the seal face 72 with the seal face 72 being at the zero depth and the edges 123 and 124 transitioning smoothly into the seal face 72. Alternatively, the continuous contour 126F also may have the circumferential edge 123 and side edges 124 recessed into the seal face 72 so as to lie at a defined depth relative to the seal face 72 which allows for the formation of a U-shaped groove wall similar to wall 117 that extends along the lengths of the side edges 124 and wider circumferential edge 123. The curved corners 122 allow for modification of the performance of the grooves 121 and the fluid flow therein as well as the fluid pressures generated within the grooves 121.

Figure 8:
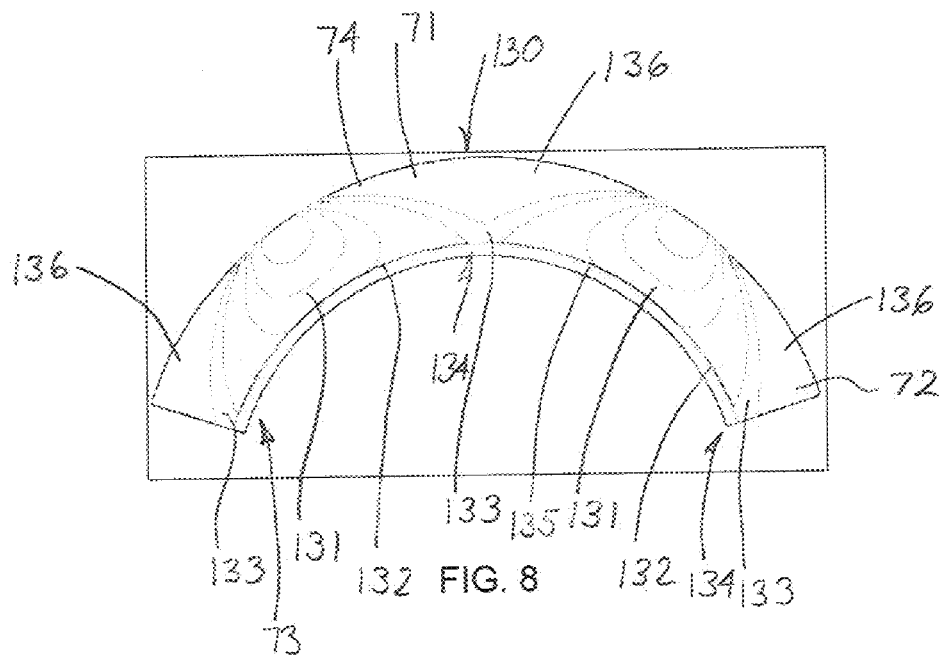
FIG. 8 is a plan view of a third embodiment of the face pattern.

In another embodiment of a pattern 130 shown in FIG. 8, the trapezoidal boundary shape is stretched circumferentially to the point of overlap of each circumferentially adjacent groove 131 wherein the overlap is located at the corners of the wider circumferential edges 132, so as to create a continuous groove 133 around the seal ring 71 in the region of overlap 134. The grooves 131 define a dam 135 and lands 136 like the pattern of FIG. 2, although each of the grooves 131 tends to fluidly communicate with each other in the region of overlap 134.

Figure 9:
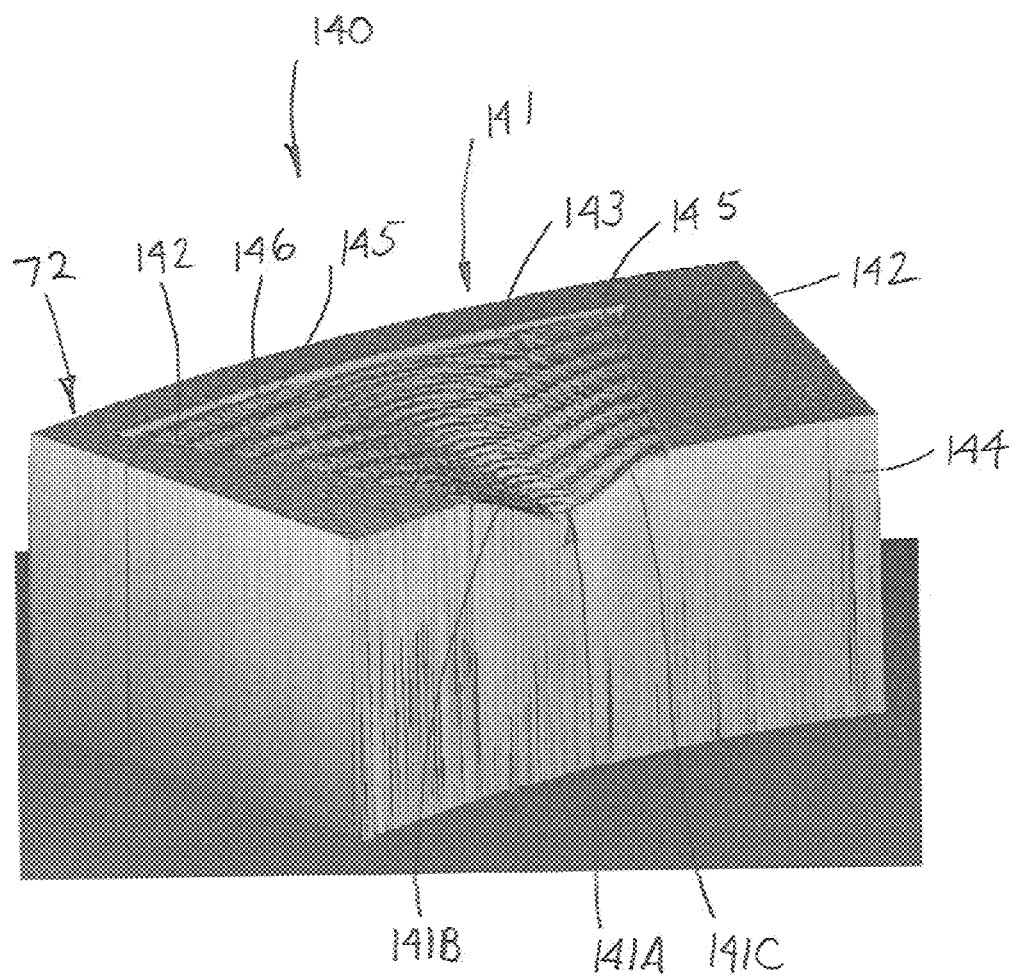
FIG. 9 is a perspective view of a recessed sine wave embodiment of the invention showing a recessed sine wave profile.

Referring to FIG. 9, an optimized sine wave pattern 140 is shown. The pattern 140 includes grooves 141 having side edges 142 and an outer diameter 143 (OD) and an inner diameter 144 (ID). This recessed sine wave pattern 140 uses z sine wave profile depth which has a tapered depth extending radially along the bottom of the groove 141 from the groove ID 144 to the groove OD 143 and has a sine wave profile in the center of the groove 141 extending circumferentially between the groove side edges 142. The sine wave profile starts at a defined depth along the groove OD 144 and side edges 142 and reaches its maximum depth in the center contour of the groove 141. Starting at the deepest center portion 141A, the groove depth non-linearly decreases tangentially in a sine wave profile across the side contours 141B and 141C wherein the groove depth decreases back to the defined depth on each of the opposite side edges 142 of the pattern 140. The center portion 141A defines the maximum depth of the amplitude of the grooves 141. The depth of the groove 141 along the side edges 142 preferably is less than 50% of the maximum depth.

Figure 4:
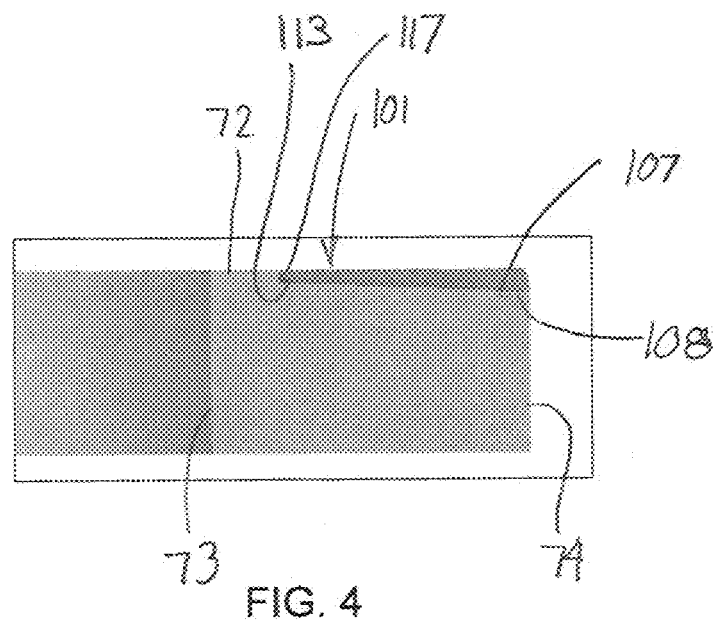
FIG. 4 is a cross-sectional view showing the radial depth profile of the face pattern as taken radially along line A-A of FIG. 3.

While FIG. 9 best shows the sine wave profile which is defined circumferentially, the cross-sectional profile extending radially is tapered like that shown in FIG. 4 while being recessed into the seal face. The sinusoidal shape defines the profile of the pattern 140, and includes a constant depth within the whole pattern area, i.e. the groove 141 is recessed to create an abrupt, step-like side face 145 along each of the groove side edges 142 and edge face 146 at the outer diameter 143 of the groove 141.

More particularly, the pattern 140 ((FIG. 9) has a tapered depth extending radially along the bottom of the groove 141 from the ID 144 to the OD 143 and has a sine wave profile in the center portion 141A of the groove 141 extending circumferentially or tangentially between the groove side edges 142. Because the groove 141 is recessed relative to the seal face, 72, the sine wave profile starts at a stepped depth along the OD 143 and side edges 142 and non-linearly increases to reach its maximum depth in the center contour 141A. Starting at this deepest contour 141A, the groove depth non-linearly decreases tangentially through the sine wave profile (FIG. 9), along the side portions 141B and 41C and then back to the stepped or recessed depth along the opposite side edges 142 and the widest circumferential edge 143 so as to define the stepped side face 145. However, while the grooves 141 are shown as being recessed into the seal face 72 to define the defined depth, it will be understood this depth may be 0% of the maximum depth at the center portion 141A so as to eliminate the stepped side face 145 along the side edges 142 as well as the widest circumferential edge 143. As such, the depth along the side edges 142 can be 0-50% of the maximum depth, while the greatest depth along the widest circumferential edge 143 may be 0-100% of the amplitude at the maximum depth at center portion 141A.

With respect to manufacture of a seal ring 71 with the pattern 140, reference numeral 145 shows the sharp edge of the recessed depth of the pattern 140. During manufacture, this constant depth preferably is applied before the sine wave profile is applied. The preferred manufacturing process is the laser machining operation disclosed in U.S. Pat. No. 7,194,803 which can be adapted to form the grooves 141 by selectively passing a laser over the seal face 72 to selectively remove material to first form the constant depth and side face 145 and then form the remainder of the sine wave pattern through additional passes of a laser. The disclosure of the '803 patent is incorporated herein in its entirety by reference. This manufacturing process may also be adapted to form any other pattern of the invention disclosed herein.

In analyzing the performance of the inventive reverse trapezoidal patterns having a sine wave shape, two additional patterns have been analyzed as a comparison as will be discussed relative to the comparative tables of FIGS. 12 and 13.

A first non-sinusoidal pattern 150 (FIG. 10) has a constant depth for the entire pattern both radially and circumferentially. A second sinusoidal pattern 160 (FIG. 11) has a sinusoidal wave profile in conventional configuration wherein the wider groove side opens toward the ring ID and the narrower groove side is closed partially across the seal face width. This second pattern 160 is not a reverse trapezoid. All of the analysis was performed at the same conditions and circumferential width, with the only difference being the pattern depths and depth profiles in the pattern.

Figure 10:
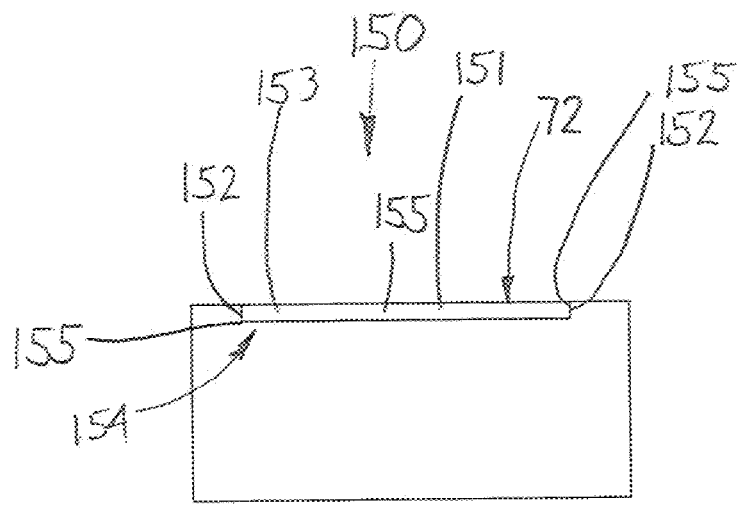
FIG. 10 is a cross-sectional view of constant depth, reverse trapezoidal face pattern showing a circumferential depth profile as taken circumferentially.

More particularly, FIG. 10 is a side view of a flat bottom, non-sinusoidal face pattern 150 that is applied to a seal face 72. For comparative purposes, this pattern 150 has a shape in plan view which is essentially the same as FIG. 2. The flat bottom pattern 150 of FIG. 10 has a constant depth across the entire trapezoidal pattern area. In this regard, FIG. 10 shows the face pattern 140 with the depth of each groove 151 being constant circumferentially (or in other words tangentially) between the side edges 152 and the depth also being constant radially between the wider and narrower circumferential edges. As such, an abrupt side wall 155 is defined along each of the side edges 152 and along the wider edge 153.

Figure 11:
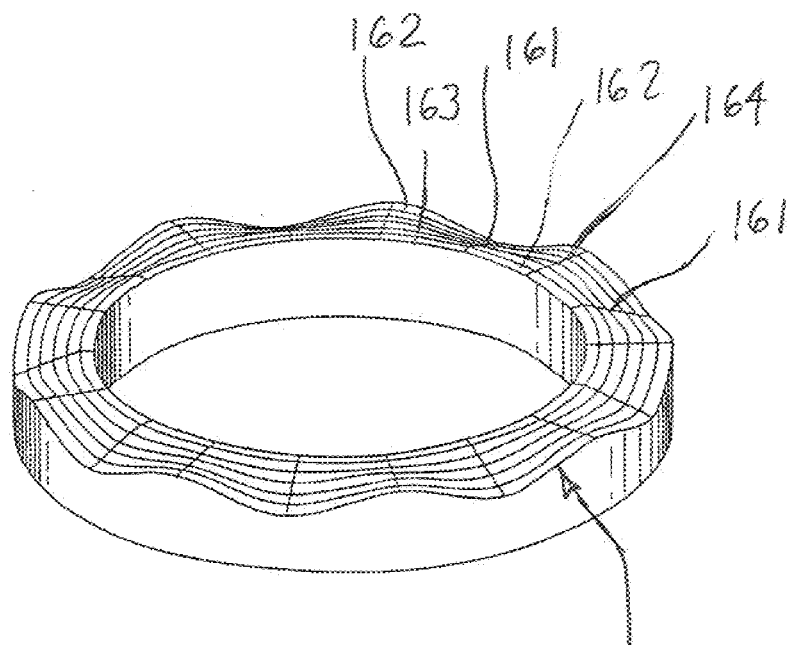
FIG. 11 is a perspective view of a prior art sinusoidal wave pattern.

Referring to FIG. 11, the second sinusoidal pattern 160 (FIG. 11) has a sinusoidal or wavy faced profile in the groove 161 defined between side edges, wherein the depth of the groove 161 progressively deepens from the outer diameter 163 (OD) to the inner diameter 164 (ID). The face pattern 160 of FIG. 11 can also be seen in U.S. Pat. No. 5,947,481, the disclosure of which is incorporated herein by reference in its entirety.

The pattern 160 includes a zero edge depth, sine wave groove 161 having side edges 162 and the outer diameter 163 (OD) and the inner diameter 164 (ID). The pattern 160 has a tapered depth extending radially along the bottom of the groove 161 from the ID 164 to the OD 163 and has a sine wave profile in the center of the groove 161 extending circumferentially between the groove side edges 162. The sine wave profile starts at a zero depth along the OD 164 and side edges 162 and reaches its maximum depth in the center of the pattern 160.

Figure 12:
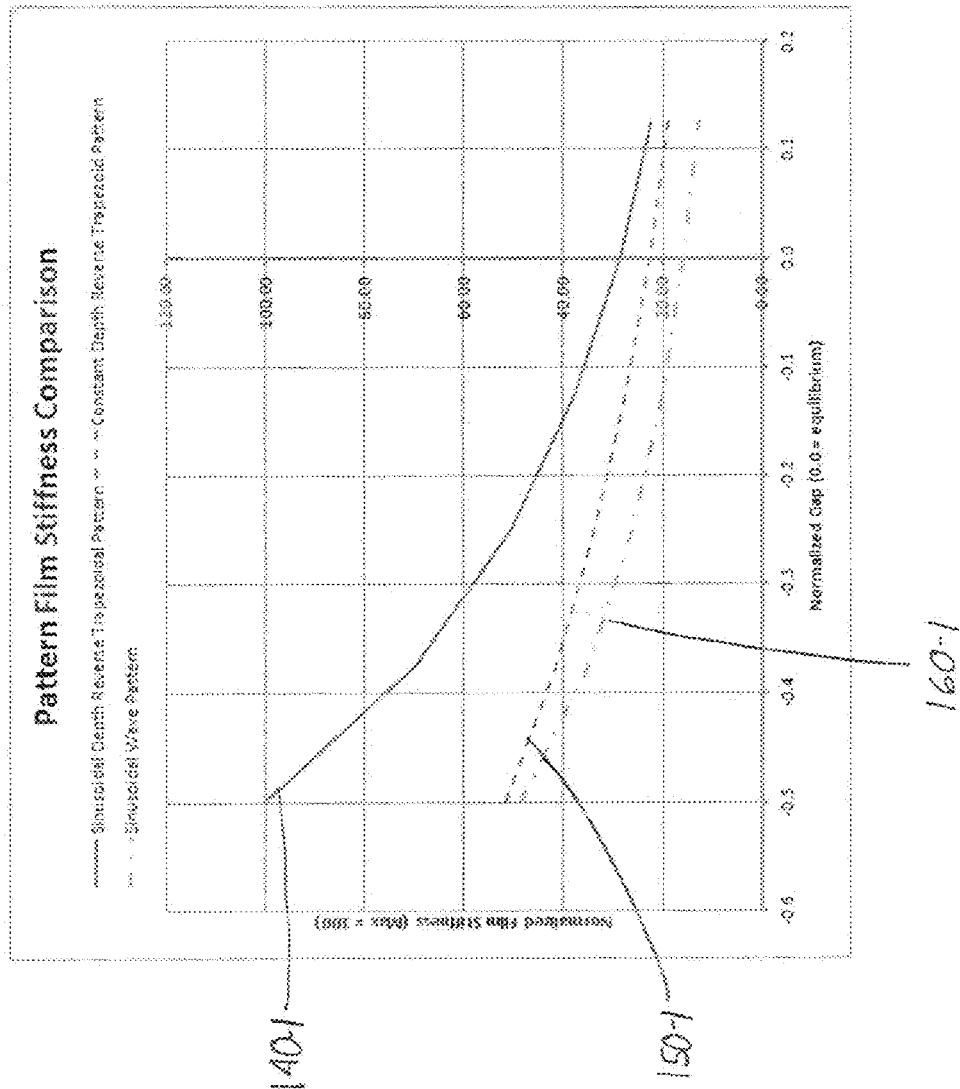
FIG. 12 is a comparative table showing a Pattern Film Stiffness Comparison of a three face patterns which include the inventive reverse trapezoidal sinusoidal depth pattern, a constant depth reverse trapezoid pattern and a sinusoidal wave pattern.
Figure 13:
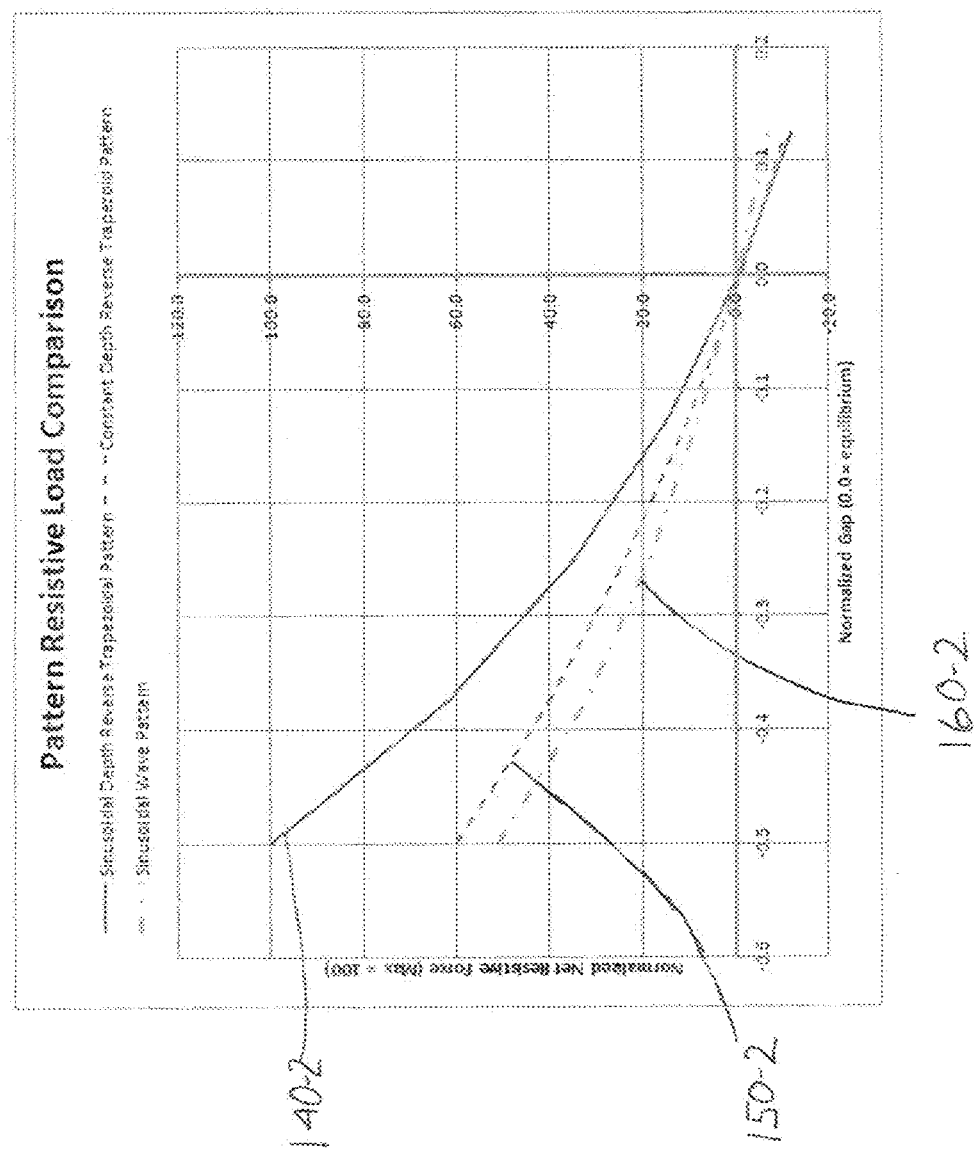
FIG. 13 is a comparative table showing a Pattern Resistive Load Comparison of a three face patterns which include the inventive reverse trapezoidal sinusoidal depth pattern, a constant depth reverse trapezoid pattern and a sinusoidal wave pattern.

Next, FIGS. 12 and 13 provided a performance comparison between the inventive, sinusoidal depth reverse trapezoid pattern as shown in FIG. 9, the constant depth reverse trapezoid pattern shown in FIG. 10, and the sinusoidal wave pattern shown in FIG. 11. In this computer-generated performance comparison, the three patterns in this analysis have been designed to have an equivalent operating gap between the patterned face 72 and a non-patterned face of an axially adjacent seal ring at a given equilibrium condition. FIG. 1 illustrates one example of a pair of seal rings disposed in axially adjacent relation.

Relative to FIG. 12, film stiffness is defined as the "spring rate" or force per inch at a given operating gap between the patterned face and non-patterned face. The resistive load is the force that the pattern generates above or below the equilibrium force when an outside influence causes the faces to be at a gap larger or smaller than the equilibrium condition. By definition, the resistive load is equal to zero when the faces are operating at their equilibrium condition.

In the "Pattern Stiffness Comparison" of FIG. 12, the analysis results are shown for the three different pattern types, namely patterns 140, 150 and 160. This chart is presented with a normalized scale, with the maximum film stiffness value for the vertical axis being normalized to 100, and the equilibrium point for the horizontal axis being normalized to 0. A value of −1.0 on the horizontal scale corresponds to a zero gap. FIG. 12 includes graph lines 140-1, 150-1 and 160-1 which correspond to the performance of face patterns 140, 150 and 160 respectively. FIG. 12 shows by graph line 140-1 that at equilibrium, the reverse trapezoid sinusoidal depth pattern 140 has a film stiffness value that is 28% greater than the constant depth trapezoid pattern 150, and 82% greater than the sinusoidal depth wave pattern 160. At a gap of half equilibrium, the reverse trapezoid sinusoidal depth pattern 140 has a film stiffness value that is 94% greater than the constant depth trapezoid pattern 150, and 106% greater than the sinusoidal depth wave pattern 160.

Next, as to the "Pattern Resistive Load Comparison" of FIG. 13, the analysis results are shown for the same three different pattern types 140, 150 and 160 which correspond to graph lines 140-2, 150-2 and 150-3. This chart is presented with a normalized scale, with the maximum resistive load for the vertical axis being normalized to 100, and the equilibrium point for the horizontal axis being normalized to 0. A value of −1.0 on the horizontal scale corresponds to a zero gap. FIG. 13 shows that at equilibrium, the reverse trapezoid sinusoidal depth pattern 140 has a resistive force value that is equal to the constant depth trapezoid pattern 150, and the sinusoidal depth wave pattern 160, all being roughly zero. At a gap of half equilibrium, the reverse trapezoid sinusoidal depth pattern 140 has a resistive force value that is 67% greater than the constant depth trapezoid pattern 150, and 96% greater than the sinusoidal depth wave pattern 160.

Therefore, the inventive depth pattern 140 provides significant and unexpected advantages over the depth patterns 150 and 160.

Figure 14:
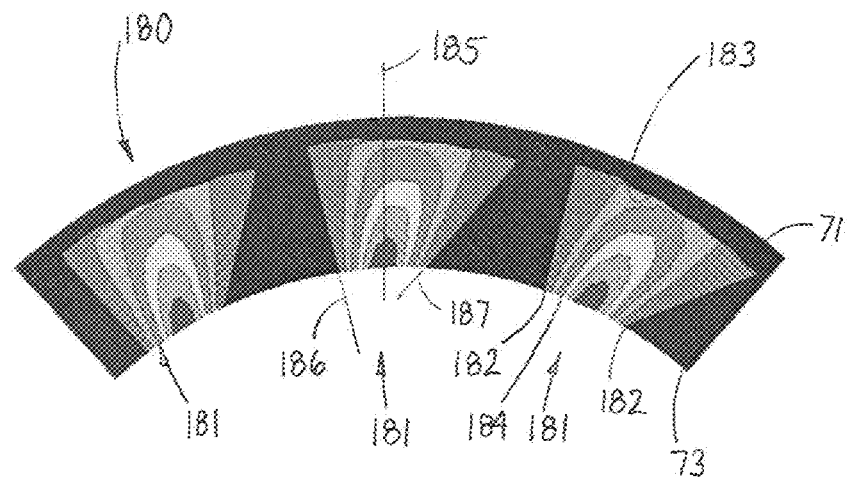
FIG. 14 is a plan view showing a canted trapezoidal face pattern located on the inner ring diameter.
Figure 15:
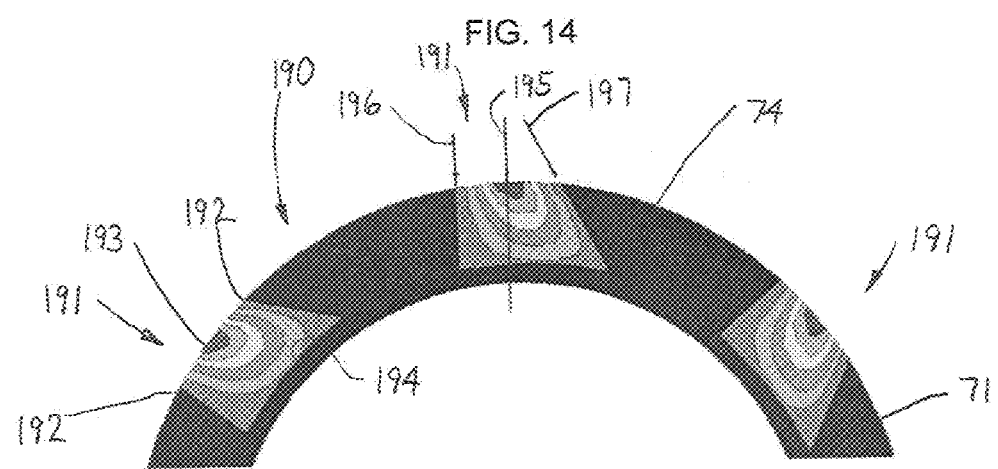
FIG. 15 is a plan view showing a canted trapezoidal face pattern on the outer ring diameter.

Next referring to FIGS. 14 and 15, canted face patterns 180 and 190 are shown which are modifications of any of the symmetrical trapezoid sine wave patterns disclosed above such as pattern 140. Essentially, the above face pattern 140 is symmetric relative to a central axis which extends radially and bisects the patterns 140. As seen in FIGS. 14 and 15, however, the canted patterns 180 and 190 are tilted or canted in the circumferential direction so that the reverse trapezoid shape is no longer symmetric about a radial bisector axis.

More particularly, the pattern 180 (FIG. 14) includes grooves 181 having side edges 182 and a wider circumferential edge 183 and a narrower circumferential edge 184. The grooves 181 have sine wave profiles as defined by the depth contours shown in FIG. 14, which depth contours are similar to those described in more detail in the preceding disclosure. The wider circumferential edge 183 is located on the high pressure side of the seal ring 71 which is on the inner diameter 73 so that face pattern 180 represents an ID pressurized face pattern.

The pattern 190 (FIG. 15) includes grooves 191 having side edges 192 and a wider circumferential edge 193 and a narrower circumferential edge 194. The grooves 191 have sine wave profiles as defined by the depth contours shown in FIG. 15. The wider circumferential edge 194 is located on the high pressure side of the seal ring 71 which is on the outer diameter 74 so that face pattern 180 represents an OD pressurized face pattern.

In both patterns 180 and 190, the right and left side edges 182 and 192 and their locations radially of the inner and outer circumferential edge boundaries of the pattern are not equal on the right and left sides of the pattern 180 or 190. Essentially, the grooves 181 and 191 are canted circumferentially relative to a radial reference line 185 or 195 which is shown extending across one groove 181 and 191. In this regard, one groove edge 182 or 192 could have a different length relative to the other side edge 182 or 192 so that the wider circumferential groove edge 183 is skewed or diverges relative to the narrower circumferential groove edge 184. Thus, the radial width of each groove 181 or 191 would be greater at one edge 182 or 192 than at the opposite groove edge 182 or 192.

Additionally, the inlet angle 186 or 196 on one groove edge 182 or 192 could differ from the inlet angle 187 or 197 on the opposite groove edge 182 or 192. As such, the grooves 181 or 191 would be asymmetric on each opposite side of a respective reference line 185 or 195.

The canting of the reverse trapezoid shape can be applied to the ID pattern 180 and the OD pattern 190 to improve dynamic lift and allow tolerance to off design conditions that can force the seal faces 72 to rotate in the opposite direction of "normal" operation. The standard features of the inventive sine wave pattern described above can be applied with the necessary modifications to make the pattern non-symmetric.

Figure 16:
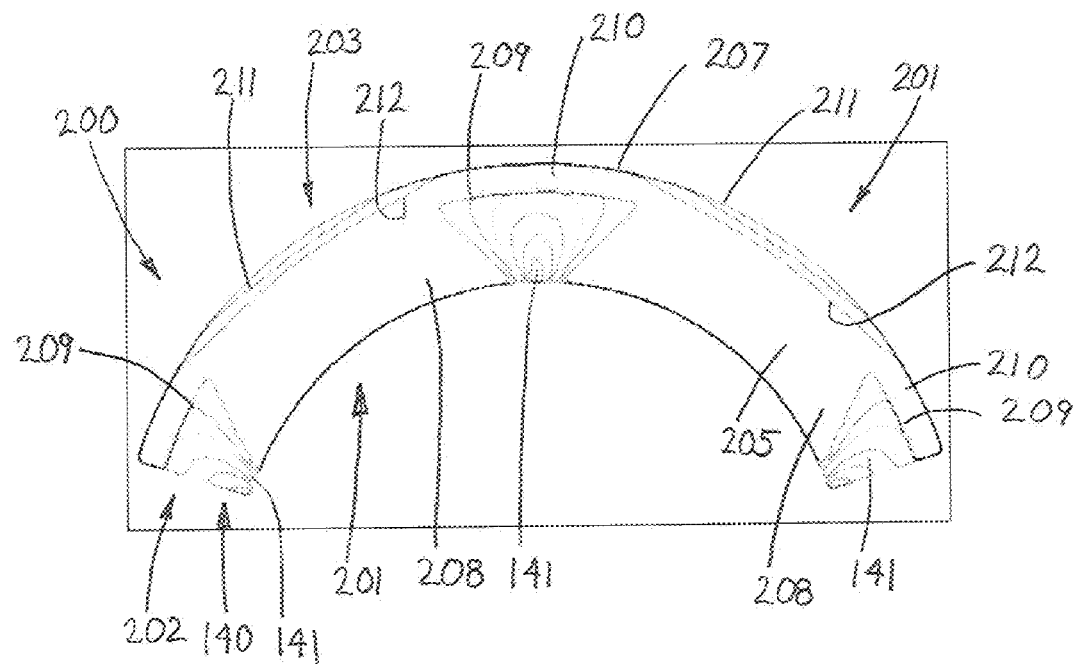
FIG. 16 is a plan view of a further aspect of the invention showing a face pattern having primary and secondary face patterns for operating under reverse pressure conditions wherein the primary face pattern preferably is a sine wave, reverse trapezoidal face pattern according to the present invention.
Figure 17:
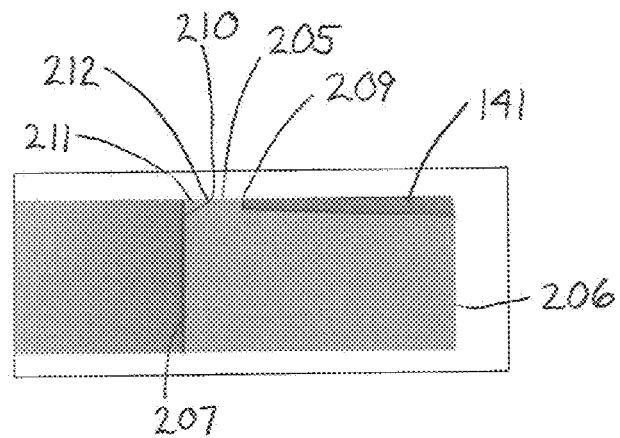
FIG. 17 is a cross-sectional view showing the radial depth profile of the face pattern of FIG. 16 as taken radially.

Referring to FIGS. 16 and 17, FIG. 16 is a plan view of a further aspect of the invention showing a seal ring 200 having a reverse pressure face pattern 201 which comprises a bidirectional primary face pattern 202 in combination with a reverse pressure secondary face pattern 203. The seal ring 200 has a conventional construction defined by a seal face 205 which extends radially between the inner and outer ring diameters 206 and 207. As described herein, the primary face pattern 202 preferably functions under normal operating conditions to create lift and preferably is bi-directional. The primary face pattern 202 is provided in combination with the secondary face pattern 203 which is functional to create lift under reverse pressure conditions wherein the pattern combination results in the ability of the faces 205 to operate with a controlled gap under normal pressure conditions as well as when the pressure direction across the seal face 205 is reversed.

As referenced above, one of the primary upset conditions that causes failure of lift-off face seals is a reversal of the pressure direction across the seal face 205. For example, referring to FIGS. 16 and 17, the inner ring diameter 206 may be the low pressure side of the seal face 205, which is exposed to the process fluid, while the outer ring diameter 207 is the high pressure side, which is exposed to a higher pressure fluid such as a barrier fluid. The reverse pressure upset condition can be caused either by a loss of the supply of barrier fluid pressure to the seal's barrier cavity, or by an increase in the pressure of the pumped process fluid. When this occurs, the pumped fluid is now at a higher pressure and is forced into the seal face 205 which fluid can then leak to the outer diameter 207.

Shallow groove features of typical lift-off face seals do not properly create lift with a pressure reversal condition, resulting in face contact. Due to the relatively wide radial width of lift-off seal faces, such as seal face 205, significant heat generation results. This can lead to wear and damage of the seal faces, which will then prevent the seal from returning to normal operation as a lift-off seal due to damage to the conventional groove pattern.

The face pattern 201 of the present invention overcomes these problems by providing the combination of the primary face pattern 202 and the secondary face pattern 203. This combined pattern includes the primary shallow groove pattern 202 along the normally high pressure side of the seal face 205 which high pressure side is on the inner ring diameter 206. The outer ring diameter 207 defines the normally low pressure side of the seal face 205, which typically is the process fluid side. This primary face pattern 202 is intended to create lift under normal operating conditions.

This primary shallow groove pattern 202 preferably comprises any of the sinusoidal or sine wave reverse trapezoidal face patterns of the present invention such as sine wave pattern 140 which comprises grooves 141. The grooves 141 are circumferentially spaced apart on the seal face 205 by intermediate lands 208 and have outer groove edges 209 which are spaced inwardly from the outer ring diameter 207 to define a dam region 210. The dam region 210 is located radially between the outer groove edge 209 and the ring diameter 207 and extends about the entire outer circumference of the seal ring 200. This primary pattern may also be provided as one of the other reverse trapezoidal face patterns disclosed herein.

The improved face pattern 201 also includes the secondary shallow groove pattern 203 along the opposite diameter 207 or periphery of the seal face 205 towards the normal low pressure side of the seal face 205 such as the process fluid side during normal operation. This reverse pressure, secondary pattern 203 is intended to create lift under reversed pressure conditions where the normally lower pressure side 207 reaches a higher pressure than the pressure defined on the opposite ring diameter 206. This secondary shallow groove pattern 203 is preferably made up of circumferentially separated secondary grooves 211 which are formed along the land 210 and extend a short distance radially inwardly from the outer ring diameter 207. Preferably, the secondary grooves 211 are formed as sinusoidal waves which increase in depth across the circumferential width of each groove 211 to the middle thereof and also decrease in depth from the outer ring diameter 207 to the inner groove edge 212.

As to the circumferential length of each groove 211, the length may be varied to generate different lift off performance depending upon the conditions expected to be encountered. In the illustrated embodiment of FIG. 16, the groove 211 generally is located radially outwardly of the lands 205 so that a full width dam 210 is formed directly outwardly of the grooves 141. In other words, the dam 210 has a full radial width defined between the outer groove edge 209 and the outer ring diameter 207. The secondary grooves 211 are still able to extend radially inwardly from the outer ring diameter 207 without cutting into the sealing dam 210 in the regions directly next to the grooves 141. Preferably, the relative radial size of the secondary pattern 203 is small in comparison to the primary pattern 202, with the secondary grooves 211 extending no more than 50% across the width of the face 205. As seen in FIG. 16, the radial groove width is less than the radial width of the dam 210.

As such, in the illustrated design version using sinusoidal waves 211, the primary and secondary patterns 202 and 203 are staggered around the circumference of the seal face 205, allowing the two patterns 202 and 203 to overlap in the radial direction without any overlap in the circumferential direction. However, it will also be appreciated that the two patterns 202 and 203 may still circumferentially overlap and possibly be circumferentially aligned with each other. In other words, the grooves 211 of FIG. 16 may be shifted circumferentially so that a portion or all of the groove 211 is located radially outwardly of the grooves 141. In FIG. 16, the full width dam 210 is located radially outwardly of the groove edge 209 but in the alternative embodiment, the dam 210 may alternatively include a groove 211 located in this dam region. In this embodiment, the radial width of the dam 210 would then be defined by the groove edge 209 on the inner side and the groove edge 212 on the outer side. In this embodiment, therefore, the grooves 211 and 141 are circumferentially overlapped instead of staggered. When there is overlap, the grooves 141 and 211 may be partially overlapped, or the groove 211 may be aligned with the groove 141 wherein the two grooves 211 and 141 are each symmetrically bisected by a common bisector line extending radially outwardly across the seal face 205. The circumferential width of the secondary sinusoidal wave pattern is also variable to vary the interaction between the primary and secondary patterns 202 and 203 in the circumferential direction and to prevent overlap in that direction.

The groove depth of secondary grooves 211 would also be shallow, typically not more than 100% of the depth of the primary grooves 171. Preferably, the groove secondary depth would be not more than 75% of the primary groove depth. The relatively small size and depth of the secondary groove pattern 203 is done due to these grooves 211 typically being run in a reverse pressure condition on a liquid product, as opposed to a gaseous fluid. If the fluid is a liquid product, incompressible fluids create higher lift forces such that the groove patterns could be sized smaller to achieve the necessary lift in comparison to groove patterns designed to create lift from a gaseous fluid. The primary pattern 202, however, is intended to be run on a gas such as a barrier gas.

While sinusoidal waves are shown, the grooves 211 could also be formed as trapezoidal boundary waves. Also, the illustrated grooves 211 are preferably bidirectional like the primary pattern 202.

In the preferred arrangement, the primary pattern 202 would be on the inside diameter 206 of the seal face 205 in a seal arrangement meant for high pressure at the inside diameter 206. The secondary pattern 203 would be on the outside diameter 207 of the seal face 205 in this seal arrangement meant for high pressure at the inside diameter 206. Alternately, the primary pattern 202 could be on the outside diameter 207 of the seal face 205 if high pressure is present at this location. In this pattern, the secondary groove pattern 202 would comprise a sinusoidal wave pattern at the opposite inner ring diameter 206 of the seal face 205 which normally is at a lower pressure.

Figure 18:
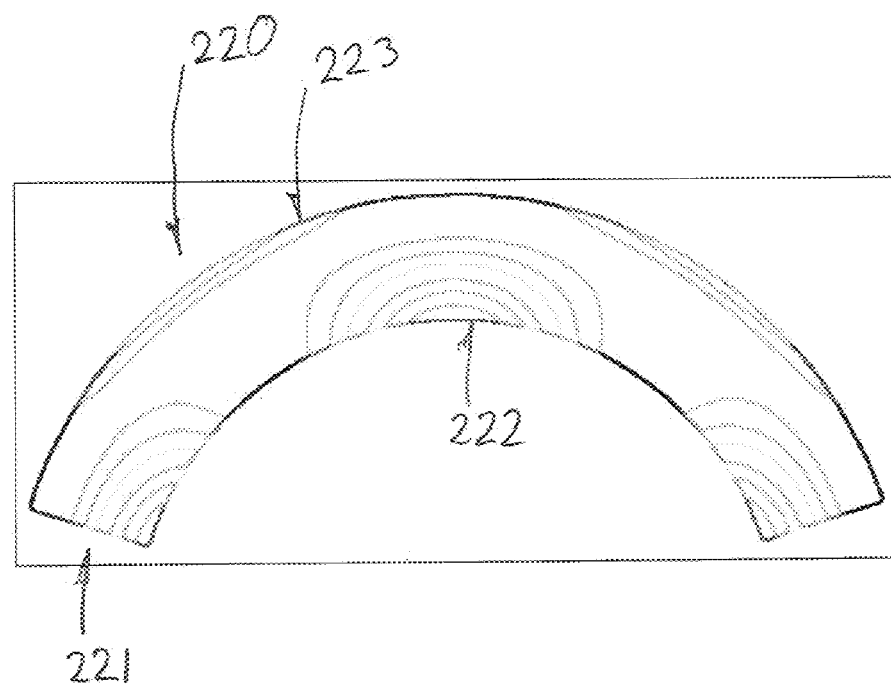
FIG. 18 is a plan view of a further aspect of the invention showing a face pattern having primary and secondary face patterns for operating under reverse pressure conditions wherein the primary face pattern preferably is a wavy face pattern.

Next, FIG. 18 is a plan view showing a seal ring 220 with an alternate face pattern 221 having a primary face pattern 222 and secondary face pattern 223 for operating under reverse pressure conditions wherein the primary face pattern 222 is a wavy face pattern. One example of a wavy face pattern is described in U.S. Pat. No. 4,836,561, the disclosure of which is incorporated herein by reference. The secondary face pattern 223 is structured like secondary pattern 203 described above. With this alternate pattern combination, the face pattern 221 is able to operate bidirectionally and under reverse pressure conditions. Alternatively, the primary face pattern 222 also could be formed as a spiral grooves with a concentric dam, or even conventional trapezoidal boundary waves having a wider groove edge exposed to the higher pressure fluid.

Figure 19:
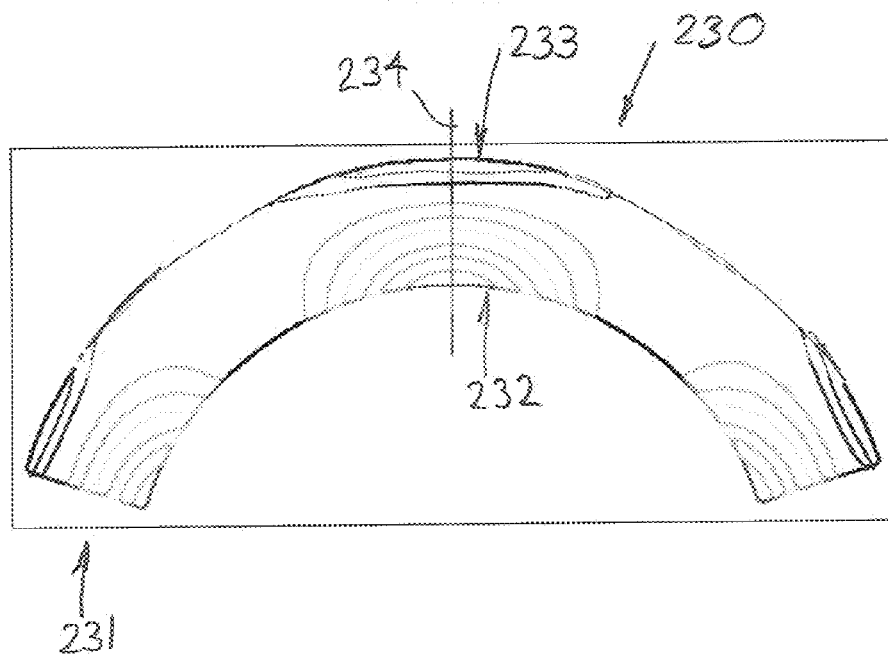
FIG. 19 is a plan view of an alternate embodiment of FIG. 18 showing a face pattern having primary and secondary face patterns radially aligned about a common radial axis.

FIG. 19 is a plan view of an alternate embodiment of FIG. 18 showing a seal ring 230 having a face pattern 231 wherein the primary and secondary face patterns 232 and 233 are radially aligned about a common radial axis 234.

Although particular preferred embodiments of the invention have been disclosed in detail for illustrative purposes, it will be recognized that variations or modifications of the disclosed apparatus, including the rearrangement of parts, lie within the scope of the present invention.

We claim:

1. A mechanical seal ring having a hydrodynamic face pattern, said face pattern comprising:
a reverse trapezoidal face pattern comprising at least one hydrodynamic lift groove recessed in a seal face of said seal ring to generate a fluid film over said seal face, each said groove being defined by outer side edges extending radially, and by narrower and wider circumferential edges extending circumferentially between said side edges wherein said wider circumferential edge intersects with said side edges to define circumferentially spaced corner areas of said groove, said narrower circumferential edge being located at one of inner and outer ring diameters of said seal ring to receive higher pressure fluid therein, and said wider circumferential edge being spaced radially from the other of said inner and outer ring diameters, said groove having a sine wave depth profile extending circumferentially between said side edges with a deepest depth being provided in a central region of said groove and shallowest depths being disposed along said side edges, said depth profile defining a variable depth amplitude which varies radially and circumferentially such that said depth profile is circumferentially narrowest at said narrower circumferential edge and circumferentially widens away from said wider circumferential edge so that said depth profile has a maximum circumferential width spaced radially away from said narrower circumferential edge and extending into said corner areas, said depth profile being progressively shallower radially from said narrower circumferential edge toward said wider circumferential edge and wherein a deepest depth amplitude is defined in a central contour located centrally in said central region of said groove at said narrower circumferential edge, and said depth profile varies across progressively shallower contours with said shallowest depth being defined along said side edges circumferentially spaced from said central contour and within said corner areas.

2. The seal ring according to claim 1, wherein said narrow circumferential edge opens radially from said one of said inner and outer ring diameters.

3. The seal ring according to claim 2, wherein said wider circumferential edge is spaced radially from said other of said inner and outer ring diameters to form a circumferential dam region on said seal face.

4. The seal ring according to claim 3 wherein said dam region is defined by an annular portion of said seal face which is located radially between said other of said inner and outer ring diameters and said wider circumferential groove edge.

5. The seal ring according to claim 1, wherein said contours allow high pressure fluid to hydrodynamically flow radially into as well as circumferentially through said grooves during shaft rotation.

6. The seal ring according to claim 1, wherein said groove is at said inner ring diameter.

7. The seal ring according to claim 1, wherein said groove is at said outer ring diameter.

8. The seal ring according to claim 1, wherein said side edges angle away from each other in opposite circumferential directions, and said reverse trapezoid shape is canted with one of said side edges being longer than the other of said side edges.

9. The seal ring according to claim 1, wherein said depth profile is recessed into said seal face such that said shallowest depths disposed along said side edges and within said corner areas are greater than zero.

10. The seal ring according to claim 9, wherein a step-like side face is defined along each of said side edges to recess said shallowest depths into said seal face, said depth profile deepening in directions extending circumferentially away from said side face along each said side edge.

11. The seal ring according to claim 10, wherein said side face extends continuously along said side edges and along said wider circumferential edge, said depth profile deepening in a radial direction extending away from said wider circumferential edge.

12. The seal ring according to claim 1, wherein said depth profile has said shallowest depths disposed along said side edges wherein said shallowest depths are substantially zero along said side edges so as to merge into said seal face and said depth profile deepening from said shallowest depth within said corner areas.

13. The seal ring according to claim 12, wherein said shallowest depths are substantially zero at said side edges and a step-like side face is defined along said wider circumferential edge in a central edge portion disposed circumferentially between said side edges.

14. A mechanical seal ring having a hydrodynamic face pattern formed on seal face extending between first and second seal ring diameters, said face pattern comprising:
a primary face pattern along said first ring diameter and a secondary face pattern along said second ring diameter, said primary face pattern being operable on a normally higher pressure side of said seal ring to create lift under normal operating conditions, said primary face pattern comprising a plurality of hydrodynamic primary grooves which are circumferentially spaced apart by lands, said primary grooves having one circumferential edge opening from said first ring diameter and extending radially to a primary groove edge which is spaced radially from said second ring diameter to define an annular dam region on said seal face; and
said secondary face pattern being provided on said second ring diameter towards a normally lower pressure side of said seal face and being operable under reverse pressure conditions wherein said higher and lower pressures switch from one of said first and second ring diameters to the other to create lift under reversed pressure conditions where the normally lower pressure side reaches a higher pressure than the normally higher pressure side, said secondary face pattern comprising circumferentially separated secondary grooves formed as sinusoidal waves; and
said primary grooves being formed with a reverse trapezoidal face pattern comprising a plurality of said primary grooves recessed in said seal face of said seal ring and having a reverse trapezoid shape to generate a fluid film over said seal face, said primary groove edge of each said primary groove being defined by side edges extending radially so as to angle away from each other in opposite circumferential directions, and by narrower and wider circumferential edges extending circumferentially between said side edges wherein said wider circumferential edge intersects with said side edges to define circumferentially spaced corner areas of said primary groove, said narrower circumferential edge being located at said first ring diameter of said seal ring to receive higher pressure fluid therein, and said wider circumferental edge being spaced radially from said second ring diameter, said primary groove having a sine wave depth profile extending circumferentially between said side edges with a deepest depth being provided in a central region of said primary groove at said narrower circumferential edge and shallowest depths being disposed along said side edges, said depth profile being progressively shallower radially from said narrower circumferential edge toward said wider circumferential edge, wherein said depth profile defines a variable depth amplitude which varies radially and circumferentially such that said depth profile is circumferentially narrowest at said narrower circumferential edge and circumferentially widens toward said wider circumferential edge so that said depth profile has a maximum circumferential width spaced radially away from said narrower circumferential edge and extending into said corner areas.

15. The seal ring according to claim 14, wherein said secondary grooves are formed radially adjacent to said lands in said dam region.

16. The seal ring according to claim 15, wherein said dam region is located radially between said groove edge and said second ring diameter and extends about an entire circumference of said seal ring.

17. The seal ring according to claim 14, wherein said first ring diameter is an inner ring diameter and said second ring diameter is an outer ring diameter.

18. The seal ring according to claim 14, wherein said first ring diameter is an outer ring diameter and said second ring diameter is an inner ring diameter.

19. The seal ring according to claim 14, wherein said secondary grooves are sinusoidal waves which increase in depth across a circumferential groove width to a center of said secondary grooves and also decrease in depth from said second ring diameter to a secondary groove edge.

20. The seal ring according to claim 14, wherein said secondary grooves are located within said dam region.

21. The seal ring according to claim 20, wherein said secondary grooves are located radially outwardly of said lands so that a full width dam is formed in said dam region radially adjacent to said primary grooves, and said secondary grooves extend radially inwardly from said second ring diameter without cutting into said dam region radially adjacent to said primary grooves, said secondary grooves extending radially no more than 50% across a face width of said seal face between said first and second ring diameters.

22. The seal ring according to claim 21, wherein a radial groove width of said secondary grooves between said second ring diameter and a secondary groove edge thereof is less than a radial width of said dam region.

23. The seal ring according to claim 14, wherein said primary and secondary patterns are staggered around a circumference of said seal face allowing said primary and secondary patterns to overlap in a radial direction without any overlap in a circumferential direction.

24. The seal ring according to claim 14, wherein a groove depth of said secondary grooves is shallow so as to be not more than 100% of a groove depth of said primary grooves.

25. The seal ring according to claim 14, wherein said primary and secondary patterns are radially aligned with a common radial axis around a circumference of said seal face.

26. The seal ring according to claim 14, wherein said side edges angle away from each other in opposite circumferential directions, and said reverse trapezoid shape is canted with one of said side edges being longer than the other of said side edges.

27. The seal ring according to claim 14, wherein said depth profile is recessed into said seal face such that said shallowest depths disposed along said side edges and within said corner areas are greater than zero.

28. The seal ring according to claim 27, wherein a step-like side face is defined along each of said side edges to recess said shallowest depths into said seal face, said depth profile deepening in directions extending circumferentially away from said side face along each said side edge.

29. The seal ring according to claim 28, wherein said side face extends continuously along said side edges and along said wider circumferential edge, said depth profile deepening in a radial direction extending away from said wider circumferential edge.

30. The seal ring according to claim 14, wherein said depth profile has said shallowest depths disposed along said side edges wherein said shallowest depths are substantially zero along said side edges so as to merge into said seal face and said depth profile deepening from said shallowest depth within said corner areas.

31. The seal ring according to claim 14, wherein said shallowest depths are substantially zero at said side edges and a step-like side face is defined along said wider circumferential edge in a central edge portion disposed circumferentially between said side edges.

32. The seal ring according to claim 1, wherein said progressively shallower contours progressively widen from said narrower circumferential edge toward said wider circumferential edge.

33. A mechanical seal ring having a hydrodynamic face pattern, said seal ring having inner and outer ring diameters and seal face extending radially therebetween, said face pattern comprising:

a reverse trapezoidal face pattern comprising at least one hydrodynamic lift groove recessed in said seal face to generate a fluid film over said seal face, each said groove being defined by outer side edges which extend radially and angle circumferentially away from each other, and by narrower and wider circumferential edges extending circumferentially between said side edges wherein said wider circumferential edge intersects with each of said side edges to define circumferentially spaced corner areas of said groove, said narrower circumferential edge being located at one of said inner and outer ring diameters to receive pressurized fluid therein, and said wider circumferential edge being spaced radially between said inner circumferential edge and the other of said inner and outer ring diameters, said groove having a sine wave depth profile extending circumferentially between said side edges with a deepest depth being provided in a central region of said groove and shallowest depths being disposed along said side edges, said depth profile defining a variable depth amplitude which varies radially and circumferentially such that said depth profile is circumferentially narrowest at said narrower circumferential edge and circumferentially widens away from said wider circumferential edge so that said depth profile has a maximum width spaced radially away from said narrower circumferential edge and extending into said corner areas, said depth profile being progressively shallower radially from said narrower circumferential edge toward said wider circumferential edge and wherein a deepest depth amplitude is defined in a central contour located centrally in said central region of said groove at said narrower circumferential edge, and said depth profile varies radially and circumferentially across progressively shallower contours with said shallowest depth being defined along said side edges circumferentially spaced from said central contour and within said corner areas, said progressively shallower contours becoming progressively wider from said narrower circumferential edge toward said wider circumferential edge so that each of said contours is narrowest at said inner circumferential edge and becomes wider away from said inner circumferential edge.

\* \* \* \* \*